(12) United States Patent
Pettinga

(10) Patent No.: US 12,503,313 B2
(45) Date of Patent: Dec. 23, 2025

(54) ROLLER CONVEYOR GAP BLOCKER

(71) Applicant: Flexible Steel Lacing Company, Downers Grove, IL (US)

(72) Inventor: Mark Steven Pettinga, Grandville, MI (US)

(73) Assignee: Flexible Steel Lacing Company, Downers Grove, IL (US)

( * ) Notice: Subject to any disclaimer, the term of this patent is extended or adjusted under 35 U.S.C. 154(b) by 0 days.

(21) Appl. No.: 18/766,600

(22) Filed: Jul. 8, 2024

(65) Prior Publication Data

US 2024/0367911 A1 Nov. 7, 2024

Related U.S. Application Data

(63) Continuation of application No. 18/198,942, filed on May 18, 2023, now Pat. No. 12,065,313, which is a continuation of application No. 17/479,441, filed on Sep. 20, 2021, now Pat. No. 11,661,283.

(60) Provisional application No. 63/081,410, filed on Sep. 22, 2020.

(51) Int. Cl.
*B65G 13/11* (2006.01)
*B65G 39/12* (2006.01)

(52) U.S. Cl.
CPC .............. *B65G 13/11* (2013.01); *B65G 39/12* (2013.01)

(58) Field of Classification Search
None
See application file for complete search history.

(56) References Cited

U.S. PATENT DOCUMENTS

| | | | |
|---|---|---|---|
| 2,232,081 | A | 2/1941 | Sloane |
| 2,237,345 | A | 4/1941 | Frentzel, Jr. et al. |
| 2,268,724 | A | 1/1942 | Shackelford |
| 2,517,983 | A | 8/1950 | Crosland |

(Continued)

FOREIGN PATENT DOCUMENTS

| | | |
|---|---|---|
| CN | 1135668 | 11/1996 |
| CN | 2420247 | 2/2001 |

(Continued)

OTHER PUBLICATIONS

U.S. Appl. No. 16/019,843, filed Jun. 27, 2018, McKee.

(Continued)

*Primary Examiner* — Kavel Singh
(74) *Attorney, Agent, or Firm* — Fitch, Even, Tabin & Flannery LLP

(57) ABSTRACT

In one aspect, a gap blocker having a body with an upper blocking portion and leg portions of the body connected to the upper blocking portion at longitudinally spaced apart locations. The leg portions of the body have an initial, undeflected configuration with at least one of the leg portions having a first orientation relative to the upper blocking portion. The leg portions of the body have an operating configuration with the body in a gap between rollers wherein the at least one of the leg portions has the first orientation relative to the upper blocking portion. The upper blocking portion has upper contact portions and the leg portions have lower contact portions for contacting the rollers. The body also has outer surface portions intermediate the upper and lower contact portions configured to be in clearance with the rollers.

14 Claims, 8 Drawing Sheets

(56) References Cited

U.S. PATENT DOCUMENTS

| | | | |
|---|---|---|---|
| 2,536,961 A | 1/1951 | Smith | |
| 2,624,444 A | 1/1953 | Casabona | |
| 2,627,960 A | 2/1953 | Eberle | |
| 2,862,599 A | 12/1958 | Sinden | |
| 2,899,086 A | 8/1959 | Saint-Andre | |
| D209,071 S | 10/1967 | Koch | |
| 3,345,957 A | 10/1967 | Welch | |
| D209,421 S | 11/1967 | Fabian | |
| 3,465,489 A | 9/1969 | Monaghan | |
| 3,548,996 A | 12/1970 | Ellis | |
| 3,587,674 A | 6/1971 | Adkin | |
| 3,623,598 A | 11/1971 | Anfossi | |
| 3,738,650 A | 6/1973 | Ossenkop et al. | |
| 3,878,735 A | 4/1975 | Preuss | |
| 3,988,880 A | 11/1976 | Miyazaki et al. | |
| 4,096,943 A | 6/1978 | Gentsch | |
| 4,132,304 A | 1/1979 | Gent | |
| 4,288,208 A | 9/1981 | Kusters | |
| 4,579,219 A | 4/1986 | Burkhardt | |
| 4,613,036 A | 9/1986 | Bourgeois | |
| 4,718,543 A | 1/1988 | Leisner et al. | |
| 4,844,234 A | 7/1989 | Born | |
| D303,974 S | 10/1989 | Karr | |
| 4,901,845 A | 2/1990 | Zoergiebel | |
| 4,989,723 A | 2/1991 | Bode et al. | |
| 5,009,307 A | 4/1991 | Chance et al. | |
| 5,044,485 A | 9/1991 | Loder | |
| 5,065,222 A | 11/1991 | Ishii | |
| 5,215,182 A | 6/1993 | Garbagnati | |
| 5,311,982 A | 5/1994 | Clopton | |
| 5,311,983 A | 5/1994 | Clopton | |
| 5,320,478 A | 6/1994 | Gonsowski et al. | |
| 5,324,582 A | 6/1994 | Goto | |
| 5,344,001 A | 9/1994 | Kawaai et al. | |
| 5,409,096 A | 4/1995 | Clopton | |
| 5,584,373 A | 12/1996 | Layne | |
| 5,597,062 A | 1/1997 | Biwer | |
| 5,597,063 A | 1/1997 | Bogle et al. | |
| 5,695,042 A | 12/1997 | Van Der Burgt | |
| D407,174 S | 3/1999 | Baker | |
| 5,957,265 A | 9/1999 | Clopton | |
| 5,971,129 A | 10/1999 | Stawniak et al. | |
| D419,742 S | 1/2000 | Abbestam | |
| 6,138,819 A | 10/2000 | Bogle et al. | |
| 6,164,435 A | 12/2000 | Coen et al. | |
| 6,550,604 B2 | 4/2003 | Maclachlan | |
| 6,589,631 B1 | 7/2003 | Suzuki | |
| 6,630,633 B1 | 10/2003 | Uber et al. | |
| D483,168 S | 12/2003 | McDaniel | |
| D484,545 S | 12/2003 | McIlvaine, IV | |
| D493,933 S | 8/2004 | Schwagermann | |
| 6,848,583 B2 | 2/2005 | Largent | |
| 6,896,122 B2 | 5/2005 | Gambrell et al. | |
| 6,959,803 B1 | 11/2005 | Layne et al. | |
| 7,137,505 B2 | 11/2006 | Stebnicki | |
| 7,210,569 B1 | 5/2007 | Tarhan et al. | |
| D547,523 S | 7/2007 | Swinderman | |
| 7,258,225 B2 | 8/2007 | Hall | |
| D553,824 S | 10/2007 | Rijksen | |
| 7,287,640 B1 | 10/2007 | Schmutzler | |
| 7,413,088 B2 | 8/2008 | Temler | |
| 7,523,820 B1 | 4/2009 | Wu et al. | |
| D611,673 S | 3/2010 | Andrews | |
| 7,673,732 B2 | 3/2010 | Underberg | |
| 7,721,874 B2 | 5/2010 | Chen | |
| 7,882,944 B1 | 2/2011 | Eubanks | |
| D635,847 S | 4/2011 | Olsson | |
| D643,709 S | 8/2011 | Olsson | |
| 8,042,682 B2 | 10/2011 | Ertel | |
| D650,143 S | 12/2011 | Bhosale | |
| 8,162,133 B2 | 4/2012 | Ruge | |
| 8,196,736 B2 | 6/2012 | Wagner | |
| 8,210,341 B2 | 7/2012 | Marshall et al. | |
| 8,365,899 B2 | 2/2013 | Mckee | |
| 8,567,591 B2 | 10/2013 | Angel | |
| 9,022,207 B2 | 5/2015 | Tully et al. | |
| 9,022,210 B2 | 5/2015 | Tully | |
| 9,027,738 B2 | 5/2015 | Coen | |
| 9,290,333 B2 | 3/2016 | Skanse | |
| 9,452,896 B2 | 9/2016 | Lee | |
| 9,550,625 B2 | 1/2017 | Specht | |
| D780,399 S | 2/2017 | Pettinga | |
| 9,643,784 B2 | 5/2017 | Guerra | |
| 9,663,306 B2 * | 5/2017 | Pettinga | B65G 47/66 |
| D789,643 S | 6/2017 | Pettinga | |
| 9,694,987 B1 | 7/2017 | Schroader | |
| 9,758,317 B2 | 9/2017 | Sammauro | |
| D819,921 S | 6/2018 | Pettinga | |
| 10,092,122 B2 | 10/2018 | Bing | |
| 10,112,131 B2 | 10/2018 | Yoon | |
| 10,233,035 B2 | 3/2019 | Pettinga | |
| 10,343,853 B2 | 7/2019 | Yasinski | |
| 10,376,938 B2 | 8/2019 | Frauenhuber | |
| 10,427,891 B2 | 10/2019 | Mckee | |
| 10,556,755 B2 | 2/2020 | Pettinga | |
| 10,646,898 B2 | 5/2020 | Hillerich, Jr. | |
| 10,654,652 B1 | 5/2020 | Folickman | |
| 10,913,616 B2 | 2/2021 | Pettinga | |
| 10,926,955 B1 | 2/2021 | Malina | |
| 11,136,194 B2 | 10/2021 | Sathiyanarayanan | |
| 11,186,448 B2 | 11/2021 | Pettinga | |
| 11,597,604 B1 | 3/2023 | Simon | |
| 11,597,608 B2 | 3/2023 | Pettinga | |
| 11,629,010 B1 | 4/2023 | Defant | |
| 11,661,283 B2 | 5/2023 | Pettinga | |
| 11,713,199 B2 | 8/2023 | Pettinga | |
| 12,065,313 B2 | 8/2024 | Pettinga | |
| 12,071,314 B2 | 8/2024 | Pettinga | |
| D1,064,492 S | 2/2025 | Pettinga | |
| 2005/0173858 A1 | 8/2005 | Temler et al. | |
| 2006/0070966 A1 | 4/2006 | Koudys et al. | |
| 2006/0108204 A1 | 5/2006 | Marsetti | |
| 2007/0023257 A1 | 2/2007 | Schiesser | |
| 2008/0296129 A1 | 12/2008 | Yagi et al. | |
| 2009/0084659 A1 | 4/2009 | Underberg | |
| 2010/0108467 A1 | 5/2010 | Barreyre et al. | |
| 2010/0230247 A1 | 9/2010 | Mckee | |
| 2011/0132725 A1 | 6/2011 | Marshall et al. | |
| 2014/0182733 A1 | 7/2014 | Mettee, II | |
| 2014/0183002 A1 | 7/2014 | Tully | |
| 2014/0183006 A1 | 7/2014 | Tully | |
| 2014/0262684 A1 | 9/2014 | Skanse | |
| 2015/0291368 A1 | 10/2015 | Pettinga | |
| 2016/0214154 A1 | 7/2016 | Frauenhuber | |
| 2017/0008705 A1 | 1/2017 | Sammauro | |
| 2017/0055749 A1 | 3/2017 | Bing | |
| 2017/0174444 A1 | 6/2017 | Schroader | |
| 2017/0246564 A1 | 8/2017 | Yoon | |
| 2017/0275102 A1 | 9/2017 | Pettinga | |
| 2018/0265309 A1 | 9/2018 | Yasinski | |
| 2018/0345324 A1 | 12/2018 | Hillerich, Jr. | |
| 2019/0002209 A1 | 1/2019 | Mckee | |
| 2020/0346868 A1 | 11/2020 | Sathiyanarayanan | |
| 2021/0101757 A1 | 4/2021 | Pettinga | |
| 2021/0179365 A1 | 6/2021 | Pettinga | |
| 2022/0089374 A1 | 3/2022 | Pettinga | |
| 2022/0162016 A1 | 5/2022 | Pettinga | |
| 2023/0098268 A1 | 3/2023 | Pettinga | |
| 2023/0102050 A1 | 3/2023 | Pettinga | |
| 2023/0278808 A1 | 9/2023 | Pettinga | |
| 2023/0286754 A1 | 9/2023 | Pettinga | |
| 2023/0303339 A1 | 9/2023 | Drummond | |
| 2024/0367911 A1 | 11/2024 | Pettinga | |

FOREIGN PATENT DOCUMENTS

| | | |
|---|---|---|
| CN | 101056807 A | 10/2007 |
| CN | 101074070 A | 11/2007 |
| CN | 101880126 A | 11/2010 |
| CN | 102695662 A | 9/2012 |
| CN | 102887423 A | 1/2013 |
| CN | 203448352 U | 2/2014 |
| CN | 104870340 A | 8/2015 |
| CN | 110691744 | 1/2020 |

(56) References Cited

FOREIGN PATENT DOCUMENTS

| | | |
|---|---|---|
| CN | 112010006 A | 12/2020 |
| DE | 3014608 | 10/1981 |
| DE | 3224557 | 1/1984 |
| DE | 8700878 | 3/1987 |
| DE | 9212012 U1 | 12/1992 |
| DE | 19858521 | 6/2000 |
| DE | 202006003116 | 4/2006 |
| EP | 0156113 | 10/1985 |
| EP | 0290255 | 11/1988 |
| EP | 0778229 | 6/1997 |
| EP | 0906879 | 4/1999 |
| EP | 0919493 | 6/1999 |
| EP | 2332865 A1 | 6/2011 |
| FR | 1561799 | 3/1969 |
| GB | 842230 | 7/1960 |
| GB | 1116571 | 6/1968 |
| GB | 1352993 | 5/1974 |
| JP | H07248011 | 9/1995 |
| JP | H08133459 A | 5/1996 |
| JP | H115264 | 1/1999 |
| JP | H11199038 | 7/1999 |
| JP | 2000177836 | 6/2000 |
| JP | 2001233447 A | 8/2001 |
| JP | 2005261873 | 9/2005 |
| JP | 2005261873 A | 9/2005 |
| JP | 2007155007 | 6/2007 |
| JP | 5181355 | 4/2013 |
| JP | 2019210100 | 12/2019 |
| KR | 1020120103680 | 9/2012 |
| KR | 101299596 | 8/2013 |
| NL | 2002344 | 6/2010 |
| SU | 590213 | 1/1978 |
| SU | 1159859 | 6/1985 |
| SU | 1328266 | 8/1987 |
| WO | 9856694 A1 | 12/1998 |
| WO | 2011071743 | 6/2011 |
| WO | 2012140269 | 10/2012 |
| WO | 2014106062 | 7/2014 |
| WO | 2017111976 | 6/2017 |
| WO | 2018191122 | 10/2018 |
| WO | 2020216783 | 10/2020 |

OTHER PUBLICATIONS

U.S. Appl. No. 62/503,118, May 8, 2017, filed Pettinga.
U.S. Appl. No. 62/526,641, filed Jun. 29, 2017, McKee.
Extended European search report issued in related European Application No. 15776877.1, issued Mar. 14, 2018, 9 pages.
Notification of Transmittal of the International Search Report and the Written Opinion of the International Searching Authority, or the Declaration from the International Bureau of WIPO for related International Application No. PCT/US15/25484, dated Sep. 11, 2015, 10 pages.
Notification of Transmittal of the International Search Report and the Written Opinion of the International Searching Authority, or the Declaration from the International Bureau of WIPO for related International Application No. PCT/US18/26505, dated Aug. 8, 2018, 13 pages.
USPTO; U.S. Appl. No. 15/483,588; Office Action mailed Mar. 6, 2018 (pp. 1-7).
USPTO; U.S. Appl. No. 15/483,588; Notice of Allowance mailed Oct. 24, 2018; (pp. 1-5).
USPTO; U.S. Appl. No. 16/019,843; Notice of Allowance mailed May 20, 2019; (pp. 1-9).
Notification of Transmittal of the International Search Report and the Written Opinion of the International Searching Authority, or the Declaration from the International Bureau of WIPO for related International Application No. PCT/US18/39995, dated Sep. 24, 2018, 14 pages.
Extended European search report issued in related European Application No. 18783966.7, issued Dec. 18, 2020, 11 pages.
Machine translation of "User and Maintenance Manual for Audi 100" cited in Office Action and Search Report in Chinese application No. 201880036374.5 (5 pages).
Translation of Office Action and Search Report mailed Nov. 4, 2020, issued in related Chinese application No. 201880036374.5, (20 pages).
U.S. Appl. No. 17/170,450, filed Feb. 8, 2021.
Written Opinion and Search Report mailed Oct. 20, 2020, issued in related Singapore Application No. 11201909461Y, 10 pages.
Translation of Office Action and Search Report mailed Jun. 7, 2021, issued in related Indonesian Application No. P00201905414, 4 pages.
Notice of Allowance issued in U.S. Appl. No. 17/170,450, mailed Aug. 2, 2021 (pp. 1-9).
Examination Report mailed Aug. 23, 2021, issued in related Indian Application No. 201917041332, 7 pages.
U.S. Appl. No. 17/537,140, filed Nov. 29, 2021.
U.S. Provisional Application No. 63/248, 196, filed Sep. 24, 2021.
U.S. Appl. No. 17/479,441, filed Sep. 20, 2021.
U.S. Appl. No. 63/257,789, filed Oct. 20, 2021.
U.S. Appl. No. 63/316,344, filed Mar. 3, 2022, 36 pages.
U.S. Design U.S. Appl. No. 29/829,490, filed Mar. 4, 2022, 24 pages.
USPTO; U.S. Appl. No. 16/604,115; Non-Final Rejection mailed May 5, 2022 (pp. 1-8).
USPTO; U.S. Appl. No. 16/604,115; Notice of Allowance and Fees Due (PTOL-85) mailed Aug. 15, 2022 (pp. 1-7).
U.S. Appl. No. 17/951,748, filed Sep. 23, 2022.
USPTO; U.S. Appl. No. 16/604,115; Notice of Allowance and Fees Due (PTOL-85) mailed Nov. 15, 2022 (pp. 1-2).
USPTO; U.S. Appl. No. 17/537,140; Non-Final Rejection mailed Nov. 23, 2022 (pp. 1-6).
English Translation of Office Action and Search Report mailed Dec. 21, 2022 in Chinese Application No. 2021113880669.
USPTO; U.S. Appl. No. 16/604,115; Notice of Allowance and Fees Due (PTOL-85) mailed Jan. 17, 2023 (pp. 1-2).
USPTO; U.S. Appl. No. 17/479,441; Notice of Allowance and Fees Due (PTOL-85) mailed Jan. 24, 2023 (pp. 1-7).
English Translation of 1st Rectification Notice mailed Dec. 9, 2022 in Chinese Application No. 202222547057.6, 3 pages.
English Translation of Office Action and Search Report mailed Jan. 9, 2023 in related Chinese Application No. 202111401429.1.
Notification of Transmittal of the International Search Report and the Written Opinion of the International Searching Authority, or the Declaration from the International Bureau of WIPO issued in International Application No. PCT/US22/44568 on Jan. 3, 2023, 25 pages.
USPTO; U.S. Appl. No. 16/604,115; Notice of Allowance and Fees Due (PTOL-85) mailed Feb. 3, 2023 (pp. 1-2).
Examination Report issued in Indian Design Application No. 370299-001 mailed Nov. 24, 2022, 2 pages.
USPTO; U.S. Appl. No. 17/479,441; Notice of Allowance and Fees Due (PTOL-85) mailed Feb. 7, 2023 (pp. 1-2).
Summons to attend oral proceedings pursuant to Rule 115(1) EPC issued in European Application No. 1577687711017, 6 pages.
U.S. Appl. No. 18/075,184, filed Dec. 5, 2022, 153 pages.
Examination Report issued in Indian Design Application No. 370298-001 mailed Nov. 24, 2022, 2 pages.
U.S. Appl. No. 18/117,076, filed Mar. 3, 2023, 84 pages.
Translation of Office Action and Search Report mailed Jul. 13, 2023, issued in related Chinese application No. 202111388066.9, (12 pages).
Translation of Second Office Action and Search Report mailed Sep. 22, 2023, issued in related Chinese application No. 202111401482.1, 20 pages.
USPTO; U.S. Appl. No. 16/782,719; Notice of Allowance mailed Sep. 14, 2020 (pp. 1-8).
European Patent Office, Office Action dated Aug. 28, 2020, from related European Patent Application No. 15776877.1, 8 pages.
USPTO; U.S. Appl. No. 16/782,719; Corrected Notice of Allowance mailed Jan. 6, 2021 (pp. 1-2).
U.S. Application No. 16/604, 115, filed Oct. 9, 2019.

(56) References Cited

OTHER PUBLICATIONS

Examination Report mailed Feb. 22, 2021, issued in related Canadian application No. 2,944,792 (5 pages).
Extended European Search Report mailed Mar. 14, 2018, issued in related European Application No. 15776877.1 (9 pages).
Office Action mailed Aug. 28, 2020, issued in related European Application No. 15776877.1 (8 pages).
Office Action mailed Jul. 13, 2020, issued in related Mexican Application No. MX/a/2016/013166 (4 pages).
"Invitation to Pay Additional Fees, and Where Applicable, Protest Fee" mailed in related International Application No. PCT/US2021/051030 on Nov. 24, 2021, 2 pages.
Notification of Transmittal of the International Search Report and the Written Opinion of the International Searching Authority, or the Declaration issued in related International Application No. PCT/US2021/051030 on Feb. 3, 2022, 12 pages.
English Summary of First Rectification Notification Issued in Chinese Patent Application for Utility Model No. 202122352683.5 on Jan. 29, 2021, 3 pages.
Updated English Summary of First Rectification Notification Issued in Chinese Patent Application for Utility Model No. 202122352683.5 on Jan. 29, 2022, 3 pages.
USPTO; U.S. Appl. No. 17/479,441; Non-Final Rejection mailed Oct. 6, 2022; (pp. 1-16).
USPTO; U.S. Appl. No. 17/479,441; Notice of Allowance and Fees Due (PTOL-85) mailed Mar. 16, 2023; (pp. 1-2).
USPTO; U.S. Appl. No. 17/537,140; Notice of Allowance and Fees Due (PTOL-85) mailed Mar. 13, 2023; (pp. 1-7).
Examination Report with machine English translation issued in Taiwanese Application No. 110135140 mailed Jan. 30, 2023, 50 pages.
USPTO; U.S. Appl. No. 17/479,441; Notice of Allowance and Fees Due (PTOL-85) mailed Mar. 22, 2023; (pp. 1-2).
Communication pursuant to Article 94(3) EPC issued in related European Application Number 18783966.7- 1017 mailed Mar. 4, 2023.
U.S. Appl. No. 18/125,417, filed Mar. 23, 2023, 45 pages.
Office Action with machine English translation issued in related Indonesian Application No. P00202107269 mailed Apr. 4, 2023; Div. 1, 6 pages.
Office Action with machine English translation issued in related Korean Application No. 1020197033129 mailed Apr. 4, 2023, 6 pages.
Office Action with machine English translation issued in related Viatnamese Application No. 1-2019-06172 mailed Mar. 31, 2023, 3 pages.
USPTO; U.S. Appl. No. 17/537,140; Notice of Allowance and Fees Due (PTOL-85) mailed May 16, 2023; (pp. 1-2).
Communication pursuant to Article 94(3) EPC mailed Mar. 17, 2022, issued in related European Application No. 15776877.1 (8 pages).
Invitation pursuant to Rule 62a(1) EPC issued in related European Application No. 15776877.1, mailed Dec. 6, 2017, 2 pages.
Examination Report issued in related Canadian Patent Application No. 2,944,792 on Aug. 5, 2022.
Examination Report issued in related European Community Design Registration Nos. 09162381-0001/009162381-0002 on Sep. 6, 2022, 3 pages.
Notification of Transmittal of the International Search Report and the Written Opinion of the International Searching Authority, or the Declaration issued in related International Application No. PCT/US2023/016011 on Jun. 26, 2023, 14 pages.
Examination Report issued in related Singapore Application No. 11201909461Y dated Dec. 2, 2021, 4 pages.
U.S. Appl. No. 18/213,678, filed Jun. 23, 2023, 142 pages.
U.S. Application No. 29/898, 156, filed Jul. 24, 2023, 10 pages.
U.S. Appl. No. 63/528,572, filed Jul. 24, 2023, 25 pages.
U.S. Appl. No. 18/198,942, filed May 18, 2023, 39 pages.
USPTO; U.S. Appl. No. 28/829,490; Non-Final Office Action mailed Jun. 25, 2024; 10 pages.
USPTO; U.S. Appl. No. 17/951,748; Non-Final Rejection mailed Apr. 24, 2024; (pp. 1-11).
USPTO; U.S. Appl. No. 18/198,942; Notice of Allowance and Fees Due (PTOL-85) mailed Jul. 9, 2024; (pp. 1-2).
USPTO; U.S. Appl. No. 17/951,748; Final Rejection mailed Sep. 10, 2024; (pp. 1-12).
USPTO; U.S. Appl. No. 18/075,184; Non-Final Rejection mailed Aug. 18, 2023; (pp. 1-9).
Office Action with machine English translation issued in related Korean Application No. 1020197033129 mailed Nov. 13, 2023, 14 pages.
USPTO; U.S. Appl. No. 18/075,184; Letter Restarting Period for Response (i.e. Letter re: References) mailed Nov. 30, 2023; (pp. 1-9).
USPTO; U.S. Appl. No. 18/075,184; Notice of Allowance and Fees Due (PTOL-85) mailed Apr. 9, 2024; (pp. 1-5).
USPTO; U.S. Appl. No. 18/075,184; Notice of Allowance and Fees Due (PTOL-85) mailed Jul. 17, 2024; (pp. 1-2).
Invitation to Pay Additional Fees and, Where Applicable, Protest Fee, for PCT/US2023/014456, mail date Aug. 14, 2023, 3 pages.
International Search Report and Written Opinion issued for application PCT/US2023/014456, mail date Oct. 27, 2023, 21 pages.
USPTO; U.S. Appl. No. 18/198,942; Non-Final Rejection mailed Dec. 7, 2023; (pp. 1-13).
USPTO; U.S. Appl. No. 18/198,942; Notice of Allowance and Fees Due (PTOL-85) mailed Mar. 26, 2024; (pp. 1-7).
USPTO; U.S. Appl. No. 18/213,678; Non-Final Rejection mailed Jan. 2, 2024; (pp. 1-9).
USPTO; U.S. Appl. No. 18/213,678; Notice of Allowance and Fees Due (PTOL-85) mailed Apr. 16, 2024; (pp. 1-5).
USPTO; U.S. Appl. No. 18/213,678; Notice of Allowance and Fees Due (PTOL-85) mailed Jul. 17, 2024; (pp. 1-2).
USPTO; U.S. Appl. No. 18/781,174; Application filed Jul. 23, 2024, entitled "Conveyor Gap Blocker"; 45 pages.
USPTO; U.S. Appl. No. 18/813,933; Application filed Aug. 23, 2024, entitled "Conveyor Transfer Guards"; 136 pages.
European Patent Office, Extended European Search Report dated Aug. 22, 2024, from related European Patent Application No. 21873243.6, 8 pages.

* cited by examiner

ROLLER CONVEYOR GAP BLOCKER

CROSS-REFERENCE TO RELATED APPLICATIONS

This application is a continuation of U.S. Nonprovisional patent application Ser. No. 18/198,942, filed May 18, 2023, which is a continuation of U.S. Nonprovisional patent application Ser. No. 17/479,441, filed Sep. 20, 2021, which issued as U.S. Pat. No. 11,661,283 on May 30, 2023, which claims the benefit of U.S. Provisional Patent Application No. 63/081,410, filed Sep. 22, 2020, which are hereby incorporated by reference in their entireties herein.

FIELD

This disclosure relates to roller conveyors and, more specifically, to gap blockers that block gaps between rollers of roller conveyors.

BACKGROUND

Roller conveyors are used to transfer objects from one location to another, such as packages in a package distribution center and products in a manufacturing environment. Roller conveyors may utilize rollers that are rotatably supported at fixed positions. The rollers contact an object on the roller conveyor to transfer the object in a downstream direction along the roller conveyor. Roller conveyors have gaps between the rollers to permit the rollers to turn without contacting one another.

Occasionally, an item may fall through one of the gaps between rollers and into an underlying area. Objects that fall through the gaps between rollers may damage an underlying structure, such as jamming a belt that drives the rollers and associated mechanisms. As another example, a portion of an object such as a corner of a box may become lodged in a gap between rollers. These situations may adversely affect the operation of the roller conveyor and the surrounding environment.

SUMMARY

In one aspect of the present disclosure, a gap blocker is provided for a roller conveyor having rollers and a gap therebetween. The gap blocker includes a body to be positioned in the gap between the rollers, an upper blocking portion of the body to inhibit an object carried by the rollers from falling through the gap, and leg portions of the body connected to the upper blocking portion at longitudinally spaced apart locations so that the leg portions have a space therebetween extending in the longitudinal direction.

The leg portions of the body have an initial, undeflected configuration with at least one of the leg portions having a first orientation relative to the upper blocking portion. To facilitate advancing the body into the gap, the leg portions of the body are shiftable relative to one another to decrease a distance across the space between the leg portions. For example, one of the leg portions may be movable toward the other leg portion or both leg portions may be movable toward each other. The leg portions of the body have an operating configuration with the body in the gap. The at least one of the leg portions has the first orientation relative to the upper blocking portion with the leg portions in the operating configuration, similar to when the leg portions are in the initial, undeflected configuration.

The upper blocking portion has upper contact portions and the leg portions have lower contact portions for contacting the rollers as the rollers rotate to convey the object in the downstream direction. In some applications, the lower contact portions are generally in clearance with the rollers and only contact the rollers as needed to limit rattling or other movement of the gap blocker in the gap. The limited contact between the lower contact portions and the rollers reduces stress and wear on the gap blocker and may provide a longer operative lifespan of the gap blocker.

The body also has outer surface portions intermediate the upper and lower contact portions along the rollers. The outer surface portions of the body are configured to be in clearance with the rollers when the body is in the gap and the leg portions are in the operating configuration. In this manner, the outer surface portions of the body reduce the contact area between the body and the rollers which reduces the frictional resistance of the gap blocker to rotation of the rollers. Reducing frictional resistance of the gap blocker to rotation of the rollers minimizes energy loss in the roller conveyor attributable to the gap blockers.

The present disclosure also provides a gap blocker that includes a body to be positioned in a gap between rollers of a roller conveyor. The body has an upper blocking portion with upstream and downstream contact portions configured to contact the rollers above a narrowest portion of the gap and a resilient lower portion of the body having upstream and downstream lower protrusions for contacting the rollers. The upstream and downstream lower protrusions are for forming limited contact areas with the rollers which minimizes frictional resistance of the resilient lower portion of the body to rotation of the rollers. In one approach, the upstream and downstream lower protrusions are configured to form a close running fit with the rollers.

The resilient lower portion of the body has a deflected configuration wherein the resilient lower portion is narrower than the narrowest portion of the gap to permit the resilient lower portion of the body to be advanced through the narrowest portion of the gap and into an operative position below the narrowest portion of the gap. The resilient lower portion of the body has an undeflected configuration wherein the upstream and downstream lower protrusions are below the narrowest portion of the gap. Because the resilient lower portion of the body is undeflected when the protrusions contact the rollers below the narrowest portion of the gap, the protrusions are positioned to resist rattling and other movements of the gap blocker while avoiding tight clamping of the rollers by the gap blocker between the protrusions and the upstream and downstream contact portions of the upper blocking portion of the gap blocker body. The limited clamping of the rollers by the gap blocker facilitates low-friction contact between the gap blocker and the rollers.

The resilient lower portion of the body has upstream and downstream clearance surface portions intermediate the upper blocking portion of the body and the upstream and downstream lower protrusions along a height of the body. The upstream and downstream surface portions of the resilient lower portion of the body are configured to be in clearance with the rollers with the body in the operative position which further reduces the contact area of the gap blocker on the rollers and reduces frictional resistance of the gap blocker to rotation of the rollers. The clearance surface portions being in clearance with the rollers means that the clearance surface portions do not engage the rollers when the gap blocker is installed and during operation of the roller conveyor so that the clearance surface portions remain spaced from the adjacent rollers even as the rollers turn during roller conveyor operation. Again, by the provision of the clearance surface portions that do not engage the adjacent rollers when installed or during operation of the roller conveyor, the gap blocker is configured so that frictional engagement with the rollers is kept to a minimum. If a heavy object contacts the gap blocker and causes one or both of the clearance surface portions to temporarily contact one or both of the rollers, the resilient lower portion returns the clearance surface portions into clearance with the rollers once the object has been conveyed downstream of the gap blocker.

In another aspect of the present disclosure, a roller conveyor is provided that includes rollers, a gap between the rollers, and a drive member extending around the rollers to transfer rotation of one of the rollers to the other roller. The drive member, such as an o-ring, has upper and lower portions or runs extending across the gap spaced apart from one another by a distance therebetween.

The roller conveyor further includes a gap blocker supported in the gap by the first and second rollers. The gap blocker has an upper blocking portion above a narrowest portion of the gap, a lower portion below the narrowest portion of the gap, and an intermediate portion extending in the narrowest portion of the gap. The gap blocker has a height that is less than the outer diameter of either of the rollers and that is less than the distance between the upper and lower portions of the drive member. The gap blocker may be in clearance with the drive member whether the gap blocker is installed with a portion of the gap blocker extending in an opening formed by the upper and lower portions of the drive member and the rollers or shifts laterally into the opening during roller conveyor operation. In this manner, the gap blocker protects the gap from a conveyed object falling therethrough while avoiding interference with the drive member rotating the rollers.

DETAILED DESCRIPTION

Figure 1:
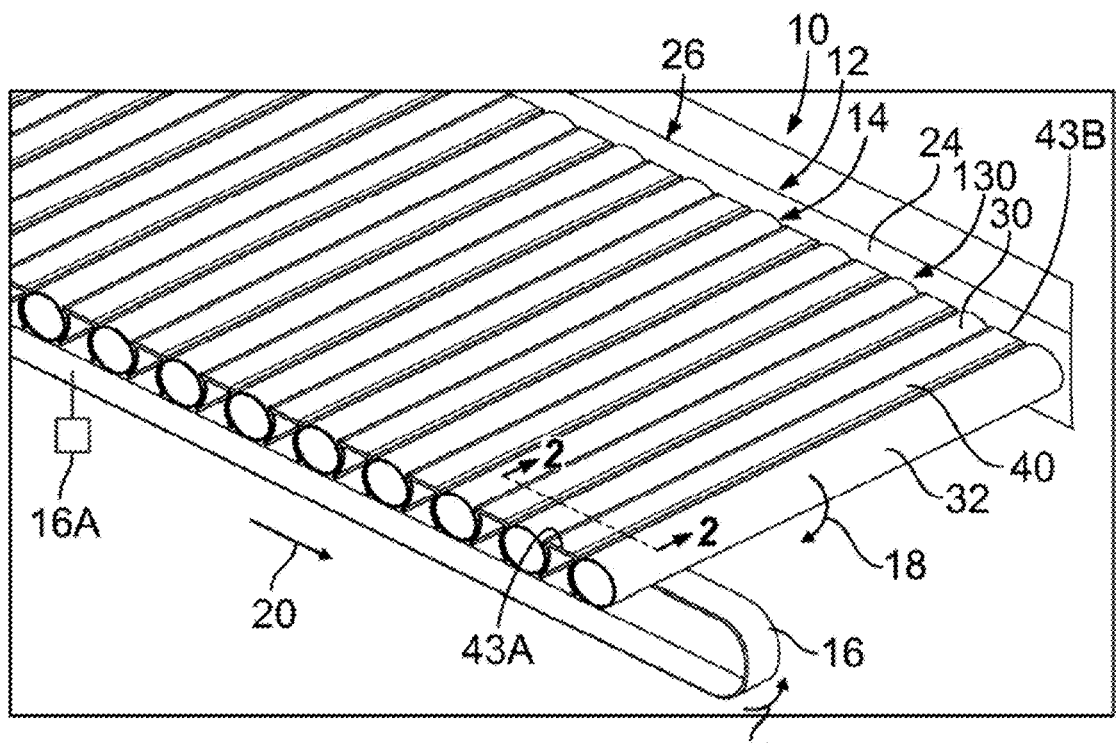
FIG. 1 is a perspective view of a roller conveyor system including rollers that are turned by a drive belt to convey an object in a longitudinal, downstream direction and gap blockers extending laterally in gaps between the rollers.

Regarding FIG. 1, a conveyor system 10 is provided that includes a roller conveyor 12 having rollers 14 that are driven by an underlying drive belt 16 to rotate in direction 18 and transfer an object in a longitudinal downstream direction 20. The drive belt 16 is driven in a loop by a motor 16A around head and tail pulleys (not shown in FIG. 1). The drive belt 16 is driven in direction 22 to engage lower portions of the rollers 14 to produce the rotation in direction 18. The rollers 14 are rotatably mounted to rails 24 of a stationary conveyor support structure 26 at fixed positions relative thereto so that the rollers 14 are stationary in the longitudinal direction 20 during operation of the roller conveyor 12.

Figure 2:
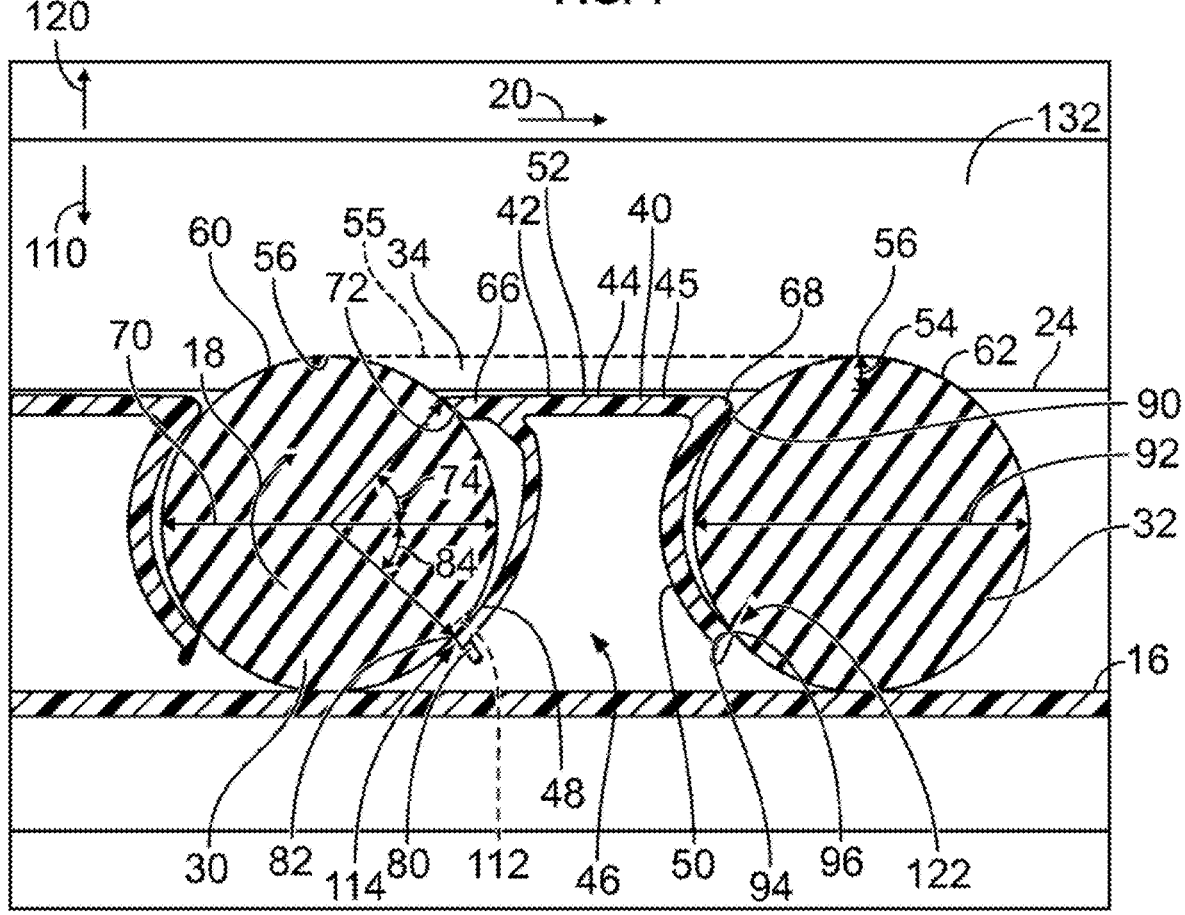
FIG. 2 is a cross-sectional view taken across line 2-2 in FIG. 1 showing one of the gap blockers in a gap between upstream and downstream rollers, the gap blocker having an upper surface that is recessed from the tops of the rollers to facilitate movement of an object across the rollers without contacting the gap blocker.

Regarding FIGS. 1 and 2, the rollers 14 have gaps 34 between adjacent upstream and downstream pairs of rollers 14. The conveyor system 10 includes gap blockers or gap blocker members 40 in the gaps 34 between adjacent rollers 14. The gap blockers 40 inhibit objects from becoming lodged in the gap 34 or falling through the gap 34. The gap blockers 40 also limit debris, such as dust, dirt, and particles from the conveyed objects from falling into the area beneath the rollers 14 such as on the drive belt 16. Roller conveyors such as the conveyor system 10 typically have rollers 14 with the same outer diameter and spacing between the rollers 14 so that there is no variation in the gap 34 between one pair of rollers 14 to the gap 34 between another pair of rollers 14. This is in contrast to conveyor belt systems having gaps between conveyor belts wherein the belt thickness can vary over time, or because different belts are used, which causes the size of the gap between the conveyor belts to vary. The gap blockers 40 may therefore have tighter tolerances than some transfer devices that are used to transfer objects between conveyor belts because the gap blockers 40 have limited engagement with the rollers 14 rather than resiliently clamping the adjacent upstream and downstream rollers 14 to keep the gap blockers 40 in the gaps 34. The tighter tolerances of the gap blockers 34 permits the gap blockers 40 to have running fits with the rollers 14 which reduces frictional drag imparted to the rollers 14 by the gap blockers 40 and improves the efficiency of the motor 16A driving the drive belt 16.

As shown in FIG. 2, the gap blocker 40 has a body 42 with an upper blocking portion 44 and a lower portion 46 including an upstream lower member such as upstream leg portion 48 and a downstream lower member such as downstream leg portion 50. In one embodiment, the body 42 of the gap blocker 40 has a unitary, one-piece construction wherein the gap blocker 40 is a single monolithic member of the same material throughout. For example, the gap blocker 40 may be formed by extruding a material, such as a plastic material, to form predetermined a length of the gap blocker 40 extending between lateral sides 43A, 43B of the gap blocker 40. In another embodiment, the gap blocker may be a single part made of multiple materials. For example, the body 42 may include a first material for a frame of the body 42 and a second lower-friction material to contact rollers. As an example in this regard, the first material may be UHMW polyethylene and the second material may be Teflon®. The multiple materials may be joined by, for example, an over-molding procedure wherein the first material is injection molded in a first mold to form the frame of the body 42. The frame of the body 42 is then inserted into a second mold wherein the second material is injected into the second mold and bonds to the frame. In yet another approach, the body 42 may be formed by multiple parts that are mechanically connected such as snap-fits and/or mating protrusions and recesses. The gap blocker 40 has a cross-section perpendicular to the length that is uniform throughout the length. The phrase uniform through the length is intended to mean that the cross-section of the gap blocker 40 perpendicular to the length is the same throughout the entire length of the gap blocker 40.

In other embodiments, the gap blocker 40 may be manufactured by injection molding or roll forming as some examples. During installation, an installer may cut each gap blocker 40 to a length that fills substantially the entire lateral width of the associated gap 34. In this regard, the predetermined length of the gap blocker 40 can be approximately the same as the length of the rollers 14. In another embodiment, a plurality of smaller length gap blockers 40 may be installed into a gap 34 to fill the gap.

One or more of the leg portions 48, 50 of the elongate gap blocker 40 are resilient to allow them to resiliently deform to install the gap blocker 40 in the gap 34. The rollers 14 include elongate rollers 30, 32 with cylindrical outer surfaces 60, 62 that contact an object as they are rotated to convey the object in the downstream direction 20. The gap blocker 40 includes an upper surface 52 that is recessed by a distance 54 from top surface portions 56 of the rollers 30, 32. As shown, the distance 54 is the vertical distance measured from a horizontal tangent line 55 to the top 56 of the rollers 30 down to the recessed upper surface 52 of the gap blocker 40. The recessed upper surface 52 permits an object to travel across the gap 34 via contact with surfaces 60, 62 of the rollers 30, 32 without contacting the upper surface 52 of the gap blocker 40. Further, the gap blocker 40 contacts a portion of the conveyed object if the object portion extends into the gap 34 sufficiently far to take up the distance 54 thereby blocking or inhibiting the object portion from extending farther into the gap 34 and potentially becoming lodged between the rollers 30, 32. In some embodiments, the gap blocker 40 may be configured to sit higher in the gap 34 such that the gap blocker 40 is operable to assist in transferring objects between the rollers 30, 32.

Regarding FIG. 2, the upper blocking portion 44 of the body 42 includes an upstream outboard portion 66 and a downstream outer roller engagement portion 68 that contact the roller surfaces 60, 62 at their upper halves above horizontal diameter lines 70, 92 of the rollers 30, 32. The upper blocking portion 44 has a central portion 45 that extends between the junctures of the upper blocking portion 44 with the leg portions 48, 50. The upstream outboard portion 66 generally continuously extends from the juncture of the upper blocking portion 44 with the leg portions 48 and the downstream outer roller engagement portion 68 is at the juncture of the upper blocking portion 44 and the leg portion 50. The upstream outboard portion 66 and the downstream outer roller engagement portion 68 may form line contacts with the roller surfaces 60, 62. The line contacts are each a localized area of engagement between the contact surface and the roller that extends linearly in a lateral direction along the length of the roller. The leg portions 48, 50 may be sized so that the leg portions 48, 50 do not extend below a plane connecting the bottoms of the rollers 30, 32 so that the leg portions 48, 50 may not interfere with a belt driving the bottoms of the rollers 30, 32.

The upstream outboard portion 66 contacts the roller surface 60 at a surface portion 72 that has an acute angle 74 from the diameter line 70 of the upstream roller 30. The upstream leg portion 48 has a lower free end portion 83 including a contact portion 80 that contacts a surface portion 82 of the roller surface 60 at an acute angle 84 below the diameter line 70 of the roller 30. In one embodiment, the angle 74 is in the range of 30-60 degrees and the angle 84 is in the range of 20-50 degrees. The angle 74 may be greater than the angle 84.

Regarding FIG. 2, the downstream outer roller engagement portion 68 contacts an arcuate surface portion 90 of the cylindrical roller surface 62 above the diameter line 92 of the downstream roller 32 and forms a line contact with the cylindrical roller surface 62 of the downstream roller 32. The downstream leg portion 50 includes a lower free end portion 85 including a contact portion 94 contacting a surface portion 96 of the roller surface 62 below the equator 92. The contact portions 80, 94 of the upstream and downstream leg portions 48, 50 may form line contacts with the roller surfaces 60, 62.

The roller surfaces 60, 62 may be made a metallic material, such as stainless steel, and the body 42 of the gap blocker 40 may be made of a polymer, such as ultra-high molecular weight (UHMW) polyethylene or another plastic, that has a low coefficient of friction with the roller surfaces 60, 62. Further, the gap blocker is configured to slidingly engage the roller surfaces 60, 62 with line contacts that minimize the contact area between the gap blocker 40 and the rollers 30, 32. In this manner, the gap blockers 40 inhibit objects from becoming lodged in the gap 34 and having objects or debris fall through the gap 34 while minimizing the resistance of the gap blockers 40 to rotation of the rollers 14.

Figure 3:
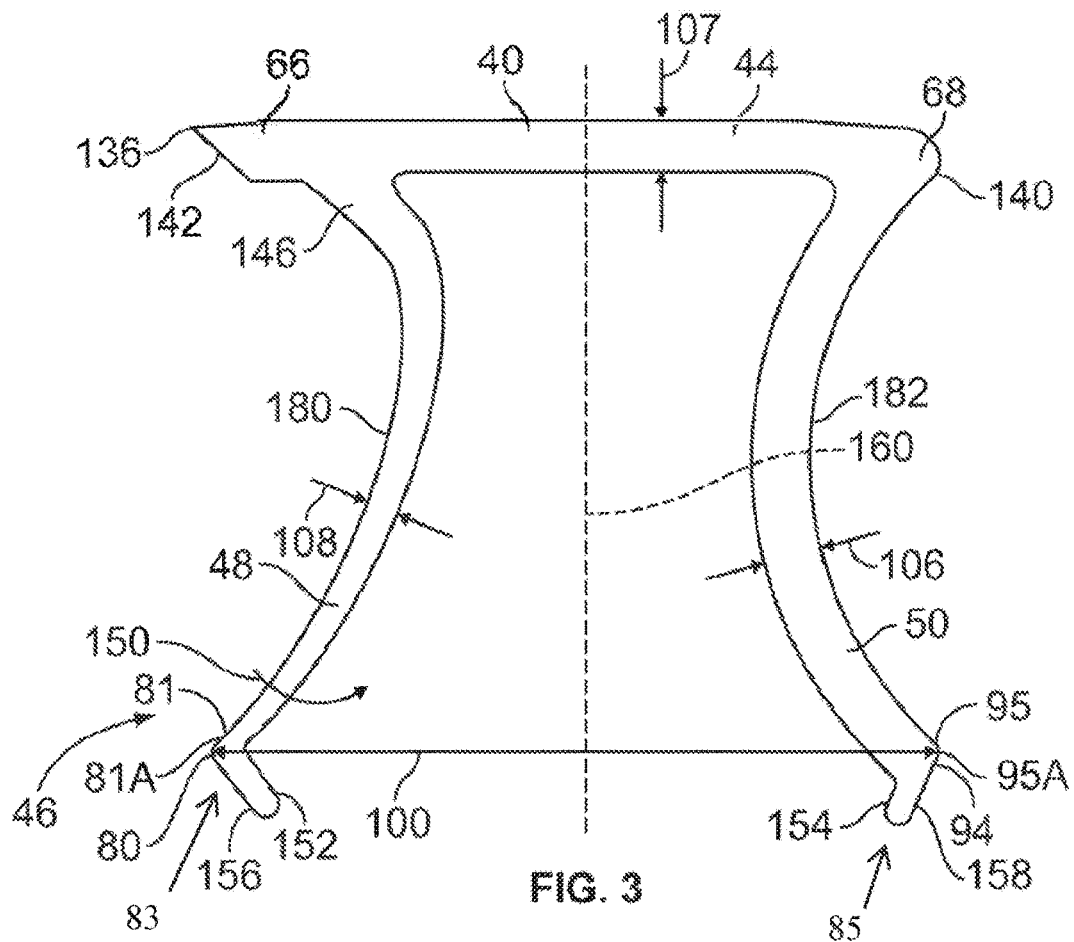
FIG. 3 is an elevational view of the gap blocker of FIG. 2 showing an upper blocking portion and lower leg portions of the gap blocker.

Regarding FIGS. 2 and 3, the gap blocker 40 has an initial configuration wherein the contact portions 80, 94 of the upstream and downstream leg portions 48, 50 are spaced by a maximum distance 100. The contact portions 80, 94 include projecting corner portions 81, 95 formed by reversely extending foot portions 152, 154 of the leg portions 48, 50. The maximum distance 100 is measured between the projecting corner portions 81, 95. The projecting corner portions 81, 95 have convex surfaces 81A, 95A contact the convex outer surfaces of the rollers 30, 32. The convex surfaces 81A, 95A are where the leg portions 48, 50 contact the rollers 30, 32. The convex surface 81A has an engaged, sliding contact with the roller 30 and the convex surface 95A has a clearance fit with the roller 32, such as a close running fit. The rest of the leg portions 48, 50 are spaced from the rollers 30, 32 to reduce frictional resistance to turning of the rollers 30, 32.

The distance 100 is larger than a distance between the surface portions 82, 96 of the rollers 30, 32 such that, upon installation of the gap blocker 40 in the gap 34, the leg portions 48, 50 are resiliently biased into contact with the roller surfaces 60, 62 to keep the gap blocker 40 in the gap 34. In one embodiment, the downstream leg portion 50 has a greater thickness 106 than a thickness 108 of the upstream leg portion 48 for at least a majority of the length thereof. This configuration allows the upstream leg portion 48 to more easily be deflected to be urged toward the downstream leg portion 50 and decrease the distance between the leg portions 48, 50 for fitting the leg portions 48, 50 into the gap 34 as discussed below with respect to FIG. 5. The thinner upstream leg portion 48 may also bend to compensate for slight movements of the upper blocking portion 44 and keep the upstream outboard portion 66 engaged with the upstream roller 30. In one embodiment, the upper blocking portion 44 has a thickness 107 that is substantially similar, such as within +/−5% of the thickness 106 of the downstream leg portion 50. The corresponding thicknesses 106, 107 of the upper blocking portion 44 and the downstream leg portion 50 provides rigidity to the downstream leg portion 50 for the leg portion 50 to resist the frictional forces imparted on the gap blocker 40 as discussed herein.

The leg portions 48, 50 are advanced into the gap 34 in direction 110 (see FIG. 2) sufficiently far so that the upstream outboard portion 66 and downstream outer roller engagement portion 68 engage the rollers. Once the projecting corner portions 81, 95 of the leg portions 48, 50 advance below the equators of the rollers 30, 32, the upstream leg portion 48 resiliently shifts away from the downstream leg portion 50 and is biased tightly against the roller surface 60. In this manner, the upstream leg portion 48 is tightly engaged with the upstream roller 30. The biased engagement between the contact portion 80 of the upstream leg portion 48 and the upstream roller 30 forms an anchor point 114 for the gap blocker 40 that is at the lower half of the roller 30 at a circumferentially fixed location thereon as the surface 60 rotates below its equator or horizontal diameter line 70. The anchor point 114 is disposed at a predetermined distance below the diameter line 70 which, in turn, keeps the upstream outboard portion 66 engaged with the roller surface 60. This limits lifting up of the upstream outboard portion 66 away from the roller surface 60 and associated vibration of the gap blocker 40. The upstream leg portion 48 is configured to have an interference or radial overlap 112 with the roller outer surface 60 so that the upstream leg portion 48 is deflected by the roller outer surface 60 when the gap blocker 40 is in the gap 34. The radial overlap 112 resiliently deflects the leg portion 48 and provides a preload for the leg portion 48 so that the leg portion 48 resiliently maintains the upstream outboard portion 66 in tight engagement with the roller surface 60.

The downstream leg portion 50 is thicker than upstream leg portion 48 and rigidly resists deflection such that the downstream leg portion 50 may be undeflected upon the gap blocker 40 installed in the gap 34 and despite the upstream leg portion 48 being deflected. The downstream leg portion 50 is configured to be undeflected with the gap blocker 40 installed in the gap 34 and during normal operation of the conveyor system 10, but there may be occasional or constant de minimis deflection due to forces applied to the downstream leg portion 50 by the rotating roller 32. Additionally, the downstream leg portion 50 may deflect when an object being conveyed contacts the gap blocker 40. As shown in FIGS. 2 and 3, the downstream leg portion 50 has the same orientation relative to the upper blocking portion 44 when the gap blocker 40 is in the gap 34 and when the gap blocker 40 is outside of the gap 34. The upstream leg portion 48 has a different orientation relative to the upper blocking portion 44 when the gap blocker 40 is in the gap 34 than when the gap blocker 40 is outside of the gap 34. More specifically, the upstream leg portion 48 is deflected when the gap blocker 40 is inside of the gap 34 due to interference between the upstream leg portion 48 and the roller outer surface 60.

Regarding FIG. 2, during conveyor operation the contact between the upstream outboard portion 66 and the roller surface 60 generally urges the upstream outboard portion 66 in downstream direction 20 and presses the downstream outer roller engagement portion 68 against the roller surface 62. The sliding contact between the downstream outer roller engagement portion 68 and the roller surface 62 tends to lift the downstream outer roller engagement portion 68 which presses the contact portion 94 of the downstream leg portion 50 against the roller surface 62. Because of its thicker construction, the downstream leg portion 50 is sufficiently strong to resist deflection towards the upstream leg portion 48 caused by the camming forces generated by this lifting movement of the downstream outer roller engagement portion 68 in vertical direction 120 and keeps the downstream outer roller engagement portion 68 and contact portion 94 engaged with the roller surface 62. Further, the contact portion 94 of the downstream leg portion 50 forms an anchor point 122 for the gap blocker 40 below the equator 92 of the roller 32. Regarding FIGS. 2 and 3, the upstream and downstream leg portions 48, 50 have upstream and downstream surfaces 180, 182 respectively, that are facing and spaced from the respective roller surfaces 60, 62. The surfaces 180 and 182 can extend for the majority of the length of the leg portions 48 and 50, respectively, to reduce friction between the gap blocker 40 and the roller surfaces 60, 62 and permit the gap blocker 40 to stay in position between the rollers 30, 32.

The roller conveyor 12 has roller bearings 130 connecting the rollers 30 to the rails 24 (see FIG. 1). Regarding FIG. 2, the conveyor system 10 may further include skirt walls 132 that extend along opposite lateral sides of the rollers 14 to keep objects on the rollers 14.

Regarding FIG. 3, the upstream outboard portion 66 includes an edge 136 that may be sharper than a more rounded edge 140 of the downstream outer roller engagement portion 68. The edge 136 may provide a low-profile transition from the roller surface 60 to limit the risk of the edge 136 becoming caught on an object transferring from roller 30 to roller 32. The upstream outboard portion 66 further includes a lower tapered surface 142 that may be either flat extending obliquely relative to upper surfaces 52 or concave to more closely conform to the curvature of the roller surface 60. The upstream outboard portion 66 projects outwardly from a transition portion 146 between the upstream outboard portion 66 and the leg portion 48. The transition portion 146 connects the upstream leg portion 48 to the blocking portion 44.

Regarding FIG. 3, during installation of the gap blocker 40, the upstream leg portion 48 may be urged in direction 150 toward the downstream leg portion 50 to decrease the distance 100 between the contact portions 80, 94 of the upstream and downstream leg portions 48, 50 to permit the leg portions 48, 50 to be advanced into the gap 34. The upstream and downstream leg portions 48, 50 may include the reversely extending foot portions 152, 154 that extend generally back toward one another, and a center axis 160 of the gap blocker 40. The foot portions 152, 154 include inclined surfaces 156, 158 that extend transversely to the center axis 160 of the gap blocker 40. One or more of the inclined surfaces 156, 158 may cammingly engage the roller surfaces 60, 62 of the rollers 30, 32 to urge the leg portions 48, 50 together as the leg portions 48, 50 are advanced into the gap 120.

Figure 4:
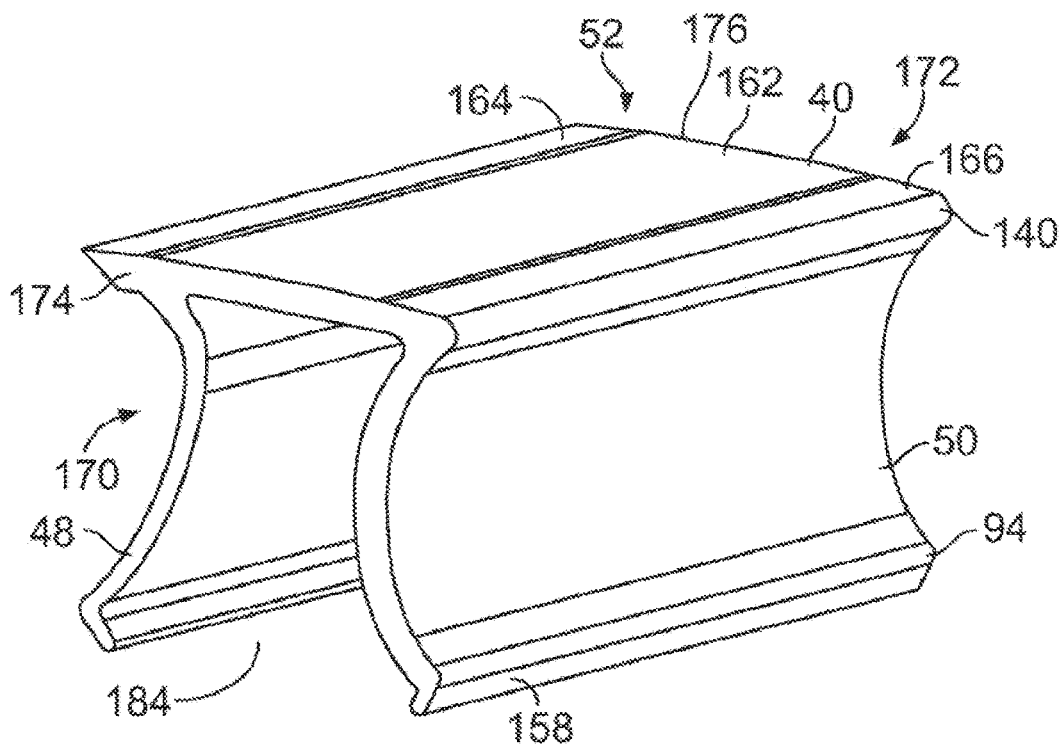
FIG. 4 is a perspective view of the gap blocker of FIG. 3 showing a thicker downstream leg portion and a thinner upstream leg portion of the gap blocker.

Regarding FIG. 4, the upper surface 52 of the gap blocker 44 includes a flat surface portion 162 and tapered surface portions 164, 166. The gap blocker 40 includes opposite lateral end portions 170, 172 having lateral sides 174, 176. The lateral sides 174, 176 may be flat or have other profiles. As illustrated, gap blocker 40 can be sized to extend along the adjacent rollers 30, 32 the majority of, or substantially the entire length of, the gap 34 so that only a single gap blocker 40 is in the gap 34. It is also contemplated that there may be two or more gap blockers 40 that are positioned side-by-side in the gap 34 to fill the lateral length of the gap 34.

Figure 5:
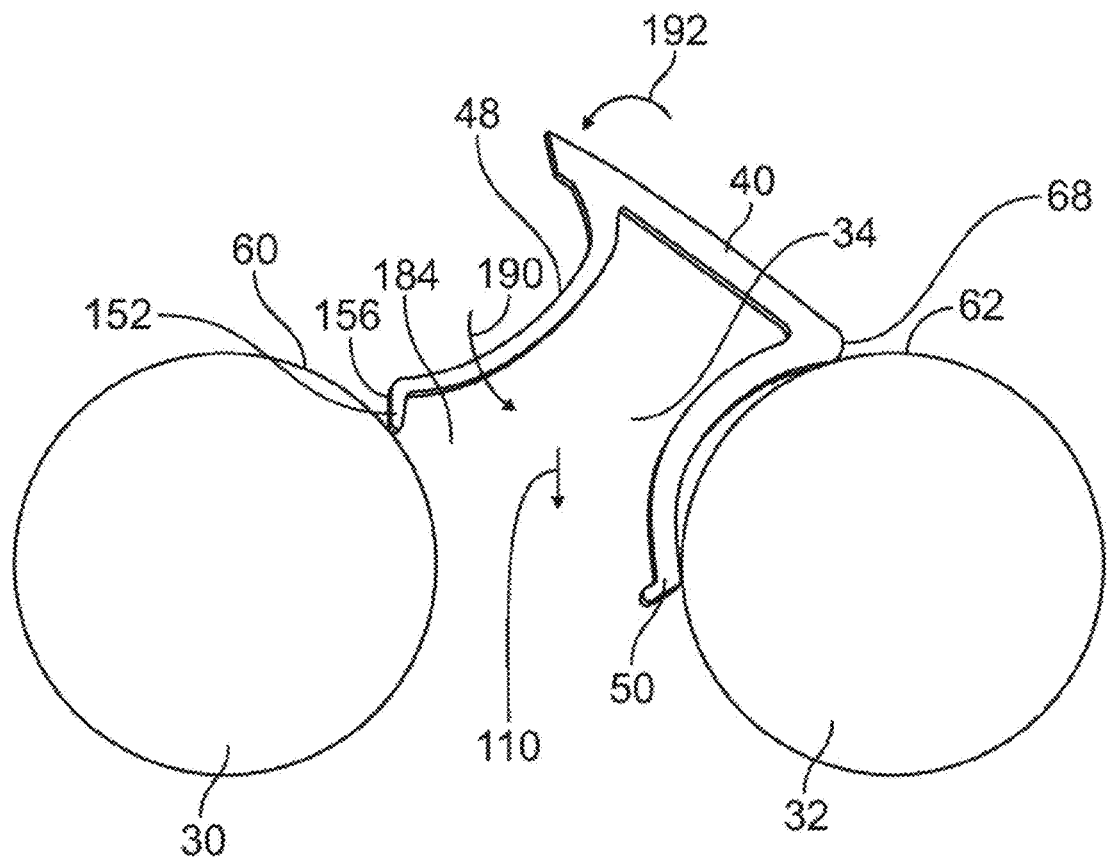
FIG. 5 is an elevational view of the rollers and gap blocker of FIG. 2 as the gap blocker is inserted into the gap between the rollers.

Regarding FIGS. 4 and 5, there is a gap 184 between the upstream and downstream leg portions 48, 50 that may be narrowed by urging the upstream leg portion 48 toward the downstream leg portion 50 during installation of the gap blocker 40 in the gap 34.

To install the gap blocker 40 into the gap 34, the gap blocker 40 is first tilted (see FIG. 5) so that the center axis 160 (see FIG. 3) of the gap blocker 40 extends obliquely to an axis perpendicular to the downstream longitudinal direction 20. The gap blocker 40 is tilted so that the thicker, downstream leg portion 50 is closer to the gap 34 than the thinner, upstream leg portion 48.

The gap blocker 40 is then advanced in direction 110 to advance the downstream leg portion 50 into the gap 34 and seat the downstream outer roller engaging portion 68 against the outer surface 62 of the roller 32 as shown in FIG. 5. Further, the foot portion 152 of the upstream leg portion 48 may rest upon the outer surface 60 of the roller 30. The direction 110 is generally orthogonal to the downstream conveyance direction 20 so that with the illustrated horizontal conveyance direction, the direction 110 is generally vertical.

Next, the installer pivots the upstream leg portion 48 generally in direction 190 toward the downstream leg portion 50 to decrease the size of the gap 184 between the upstream and downstream leg portions 48, 50. The installer then rocks the gap blocker 40 in direction 192 while holding the upstream leg 48 in its deflected position near downstream leg 50 so that the inclined surface 156 of foot portion 152 slides along roller surface 60 and the foot portion 152 advances along direction 110 farther into the gap 34. The installer presses on the blocking portion 44 to urge the gap blocker 40 farther down into the gap 34 until the contact portion 156 of the upstream leg portion 156 snaps below the horizontal diameter 70 of the roller 30. In some embodiments, the downstream leg portion 50 is sufficiently rigid such that the downstream leg portion 50 resists deflection and maintains the orientation shown in FIG. 5 relative to the upper blocking portion 44 as the upstream leg 48 is deflected in direction 190 and the upstream and downstream leg portions 48, 50 are advanced in direction 110 into the gap 34.

Due to the lateral length of gap blocker 40, an installer may first position one lateral side portion 170, 172 in the gap 34 by urging the upstream leg portion 48 toward the downstream leg portion 50 as discussed above. The installer may then position the other lateral side portion 170, 172 into the gap 34 by keeping the upstream leg portion 48 urged toward the downstream leg portion 50 and pressing the other lateral side portion 170, 172 into the gap 34.

Figure 6:
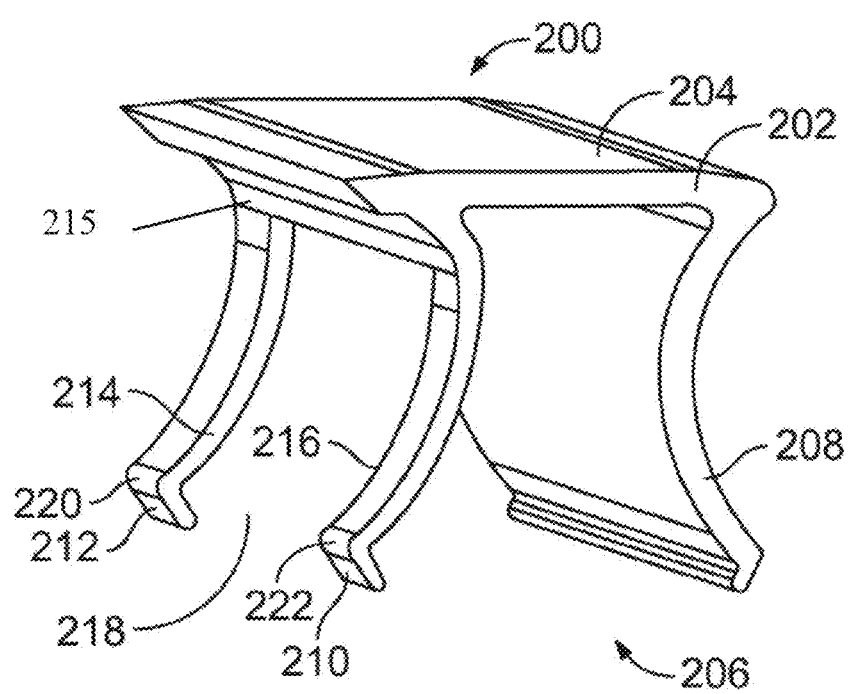
FIG. 6 is a perspective view of another gap blocker having a pair of upstream leg portions separated by an opening.

Regarding FIG. 6, another gap blocker 200 is provided that is similar in many respects to the gap blocker 40 discussed above such that only differences will be highlighted. The gap blocker 200 includes a unitary body 202 having an upper blocking portion 204 and legs such as lower leg portions 206. The leg portions 206 include a third leg portion such as a downstream leg portion 208 and first and second leg portions such as a pair of upstream leg portions 210, 212. The gap blocker 200 may have two, three, four, or any number of spaced apart upstream leg portions as desired for a particular application. A wall portion 215 connects the upstream leg portions 210, 212 to the upper blocking portion 204. The upstream leg portions 210, 212 have side surfaces 214, 216 laterally separated by an opening such as a closed-ended opening 218. The closed-ended opening 218 provides a reduced surface area of contact against an upstream roller at the lower, upstream portion of the gap blocker 200. More specifically, the gap blocker 200 has a pair of relatively small contact portions 220, 222 of the upstream leg portions 210, 212 that engage against an upstream roller. The contact portions 220, 222 have convex surfaces that form line contacts with the convex outer surface of the upstream roller. This may reduce the frictional contact between the gap blocker 20 and the upstream roller.

Figure 7:
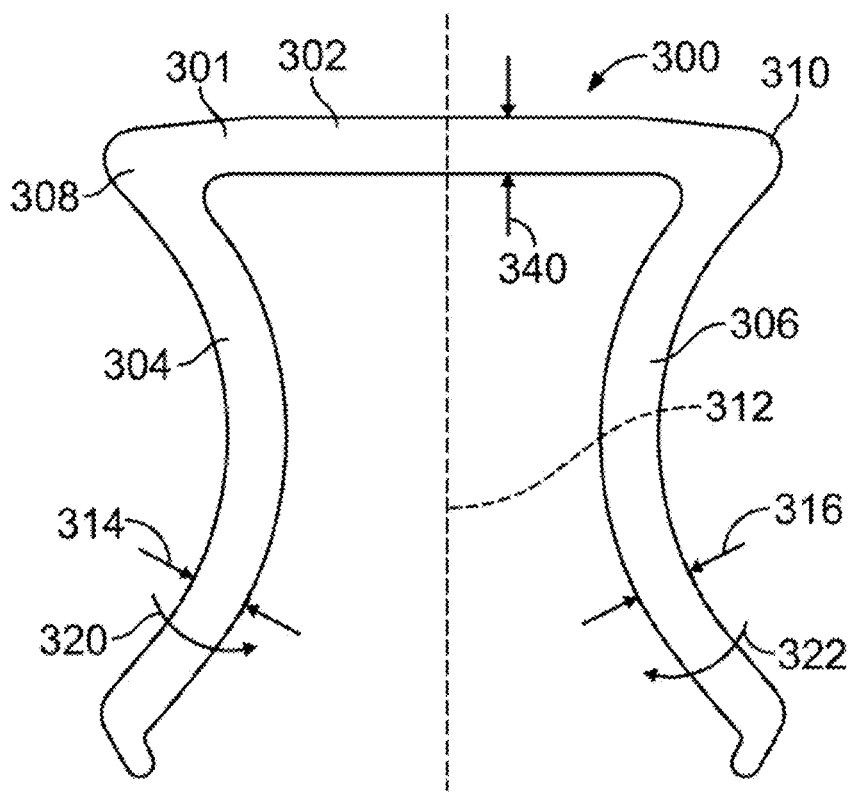
FIG. 7 is an elevational view of another gap blocker that has identical lower leg portions and may be installed in a gap between rollers with either leg portion contacting the upstream roller associated with the gap.
Figure 8:
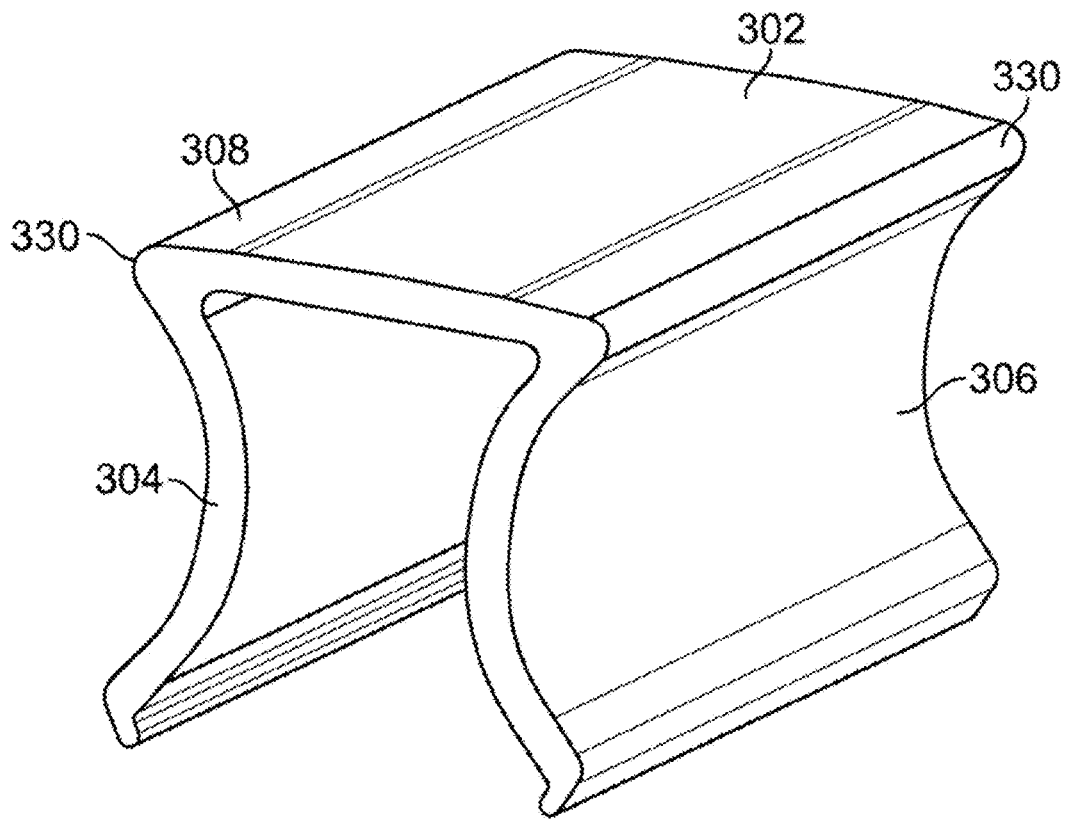
FIG. 8 is a perspective view of the gap blocker of FIG. 7 showing the leg portions depending from outer roller engaging portions of the gap blocker.

Regarding FIG. 7, another gap blocker 300 is provided that is similar in many respects to the gap blockers discussed above such that only differences will be highlighted. The gap blocker 300 includes an upper blocking portion 302, leg portions 304, 306 and upstream and downstream outer roller engaging portions 308, 310 of the body 301. The gap blocker 300 is symmetrical about a center axis 312. The symmetry of the gap blocker 300 permits the gap blocker 300 to be installed in a gap between rollers with either the leg portion 304 or the leg portion 306 positioned against the upstream roller. The leg portions 304, 306 are symmetrically configured and have a similar thickness 314, 316 to be provided with similar flexibility so that either leg portion 304, 306 may be deflected toward the other leg portion 304, 306 in directions 230, 233 during installation of the gap blocker 300. Regarding FIG. 8, the roller engaging portions 308, 310 each have a rounded edge 330 to form a line contact with the associated roller.

The gap blocker 300 may have a thickness 340 of the upper blocking portion 302 that is substantially equal to the thicknesses 314, 316 of the leg portions 304, 306. The thicknesses 314, 316, 340 may be +/−5% of each other as some examples.

Figure 9:
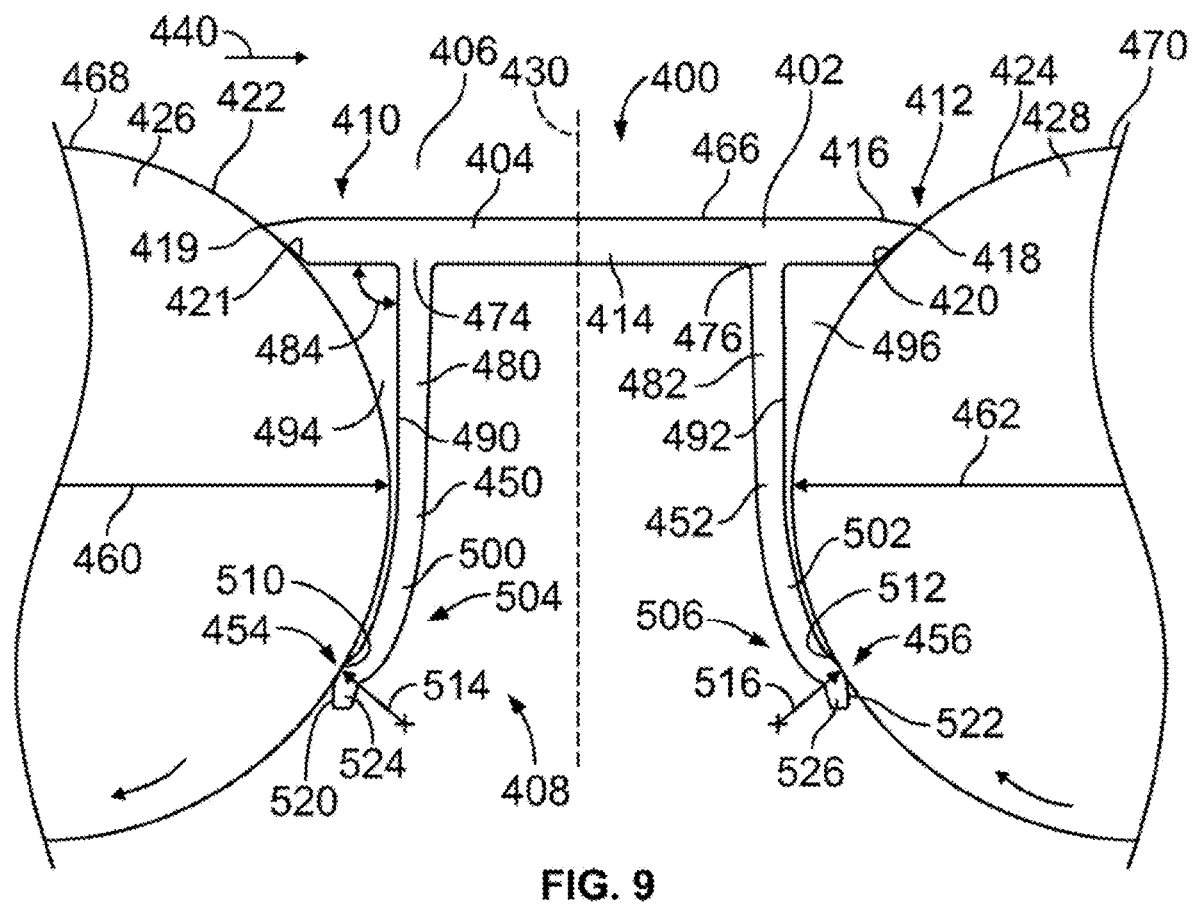
FIG. 9 is an elevational view of another gap blocker that has leg portions with substantially straight portions that depend from an upper blocking portion of the gap blocker.

Regarding FIG. 9, a gap blocker 400 is provided that is similar in many respects to the gap blockers discussed above such that differences will be highlighted. The gap blocker 400 has a body 402 that includes an upper blocking portion 404 to block a gap 406 and a lower portion 408 to keep the gap blocker 400 in the gap 406. In one embodiment, the body 402 has a unitary, one-piece construction. The body 402 may be made from a plastic material, such as an injection molding, extruding, or additive manufacturing as some examples. The upper blocking portion 404 includes outboard portions 410, 412, and a central portion 414. The outboard portions 410, 412 each have tapered upper surfaces 416, edges 418, 419, and tapered lower surfaces 420, 421 that taper toward each other to outboard edges 418, 419. The tapered lower surfaces 420 of the outboard portions 410, 412 may contact cylindrical surfaces 422, 424 of rollers 426, 428. In some embodiments, the edges 418, 419 form contacts with the surfaces 422, 424.

The gap blocker 400 has center axis 430 and is symmetrical about the center axis 430. This permits the gap blocker 400 to be positioned in a gap 406 with either outboard portion 410, 412 oriented to contact the upstream roller 426 to receive and block the gap 406 from an object traveling in direction 440. The lower portion 408 of the body 402 includes leg portions 450, 452 with contact portions 454, 456 that contact the roller surfaces 422, 424 below diameter lines 460, 462 of the rollers 426, 428. The leg portions 450, 452 each have outer surfaces 490, 492 that are spaced by gaps 494, 496 from the surfaces 422, 424 of the rollers 426, 428 to limit contact between the gap blocker 400 and the rollers 426, 428. This clearance between the surfaces 490, 492 and the adjacent rollers 426, 428 is present once the gap blocker 400 is installed between the rollers and, after installation, during operation of the roller conveyor. As such, as the rollers 426, 428 rotate, the surfaces 490, 492 of the gap blocker 400 remain spaced from the adjacent rollers 426, 426 along their entire extent so as not to generate any frictional engagement therebetween.

The gap blocker 400 is supported in the gap 406 by the outboard portions 410, 412 in sliding contact with the roller surfaces 422, 424 and the weight of the gap blocker 400 keeping the outboard portions 410, 412 contacting the roller surfaces 422, 424. The contact portions 454, 456 of the leg portions 450, 452 are generally in clearance with the roller surfaces 422, 424, such as having a close running fit with the roller surfaces 422, 424. The contact portions 454, 456 of the leg portions 450, 452 may occasionally contact the roller surfaces 422, 424 to resist or minimize rattling of the gap blocker 400. The contact portions 454, 456 of the leg portions 450, 452 are typically in clearance with the roller surfaces 422, 424 during operation of the rollers 426, 428 which limits the surface area of the gap blocker 400 which can resist rotation of the rollers 426, 428 and reduces frictional resistance of the gap blocker 400 to rotation of the rollers 426, 428. Further, the leg portions 450, 452 are in an undeflected configuration when the gap blocker 400 is in the gap 406 such that clamping of the rollers 426, 428 between the outboard portions 410, 412 and leg portions 450, 452 is avoided which further reduces frictional resistance of the gap blocker 400 to rotation of the rollers 426, 428. The gap blocker 400 may thereby block a conveyed object from falling through the gap 406 while preserving the operational efficiency of the roller conveyor.

The upper blocking portion 404 includes an upper surface 466 that is recessed relative to top surface portions 468, 470 of the rollers 426, 428. This permits packages or other objects to transfer in downstream direction 440 from the roller 426 to the roller 428 without contacting the gap blocker 400. In other embodiments, the gap blocker 400 is configured to position the upper blocking portion 404 higher in the gap 406 so that objects are transferred from roller 426 to roller 428 via the upper surface 466.

The body 402 includes junctures 474, 476 between the leg portions 450, 452 and the upper blocking portion 404. The leg portions 450, 452 include substantially straight portions 480, 482 depending from the junctures 474, 476. The straight portions 480, 482 extend at an angle 484 relative to the outboard portions 410, 412. The straight portions 480, 482 may have a thickness in the longitudinal direction that decreases as the leg portions 480, 482 extend downward from the upper blocking portion 404 which distributes bending of the leg portions 480, 482 over the length of the straight portions 480, 482. In one embodiment, the angle 484 is substantially perpendicular, i.e., ninety degrees plus or minus five degrees. The orientation of the outboard portions 410, 412 and the straight portions 480, 482 of the leg portions 450, 452 create a branched shape of the upstream and downstream sides of the body 402 as the body 402 extends away from the central portion 414 of the body 402.

The leg portions 450, 452 extend downward away from the upper blocking portion 404 and include lower curved portions 500, 502 that curve below horizontal diameter lines 460, 462 of the rollers 426, 428. The curved portions 500, 502 position end portions 504, 506 of the leg portions 450, 452 below the diameter lines 460, 462.

The end portions 504, 506 include the contact portions 454, 456. In one embodiment, the contact portions 454, 456 include convex surface portions 510, 512 each having a radius of curvature 514, 516 that may be similar or different. The end portions 504, 506 further include inclined surface portions 520, 522 that may cam against the roller surfaces 422, 424 as the leg portions 450, 452 are advanced downwardly into the gap 406 such that the engagement therebetween urges the leg portions 450, 452 toward each other so that the contact portions 454, 456 may be advanced past the narrowest portion of the gap 406 defined between the diameter lines 460, 462 of the rollers 426, 428. The end portions 504, 506 may include foot portions 524, 526 having portions of the convex surface portion 512 and/or the inclined surface portion 522 thereon.

Figure 10:
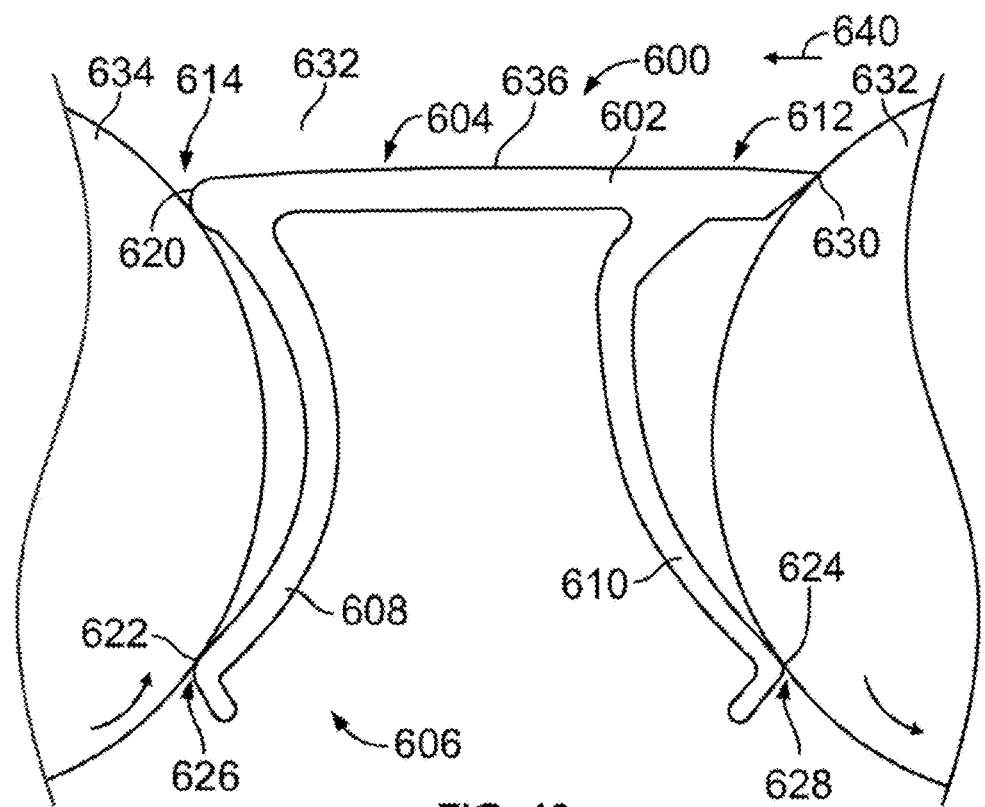
FIG. 10 is an elevational view of another gap blocker having pronounced contact surfaces for contacting rollers.

Regarding FIG. 10, a gap blocker 600 is provided that is similar in many respects to the gap blockers discussed above. The gap blocker 600 includes a body 602 having an upper blocking portion 604 and a lower portion 606 that includes leg portions 608, 610. The body 602 has an upstream outboard portion 612 and a downstream outer roller engagement portion 614. The gap blocker 600 includes an extended convex surface 620 of the downstream outer roller engagement portion 614 and extended convex surfaces 622, 624 of contact portions 626, 628 of the leg portions 608, 610. The upstream outboard portion 612 has an edge 630 contacting an upstream roller 632 and blocking a gap 632 between the upstream roller 632 and the downstream roller 634. The upper blocking portion 604 has an upper surface 636 that is recessed relative to the upper surface portions of the rollers 632, 634 such that objects may be conveyed in directions 640 from rollers 632, 634 without contacting the gap blocker 600.

Figure 11:
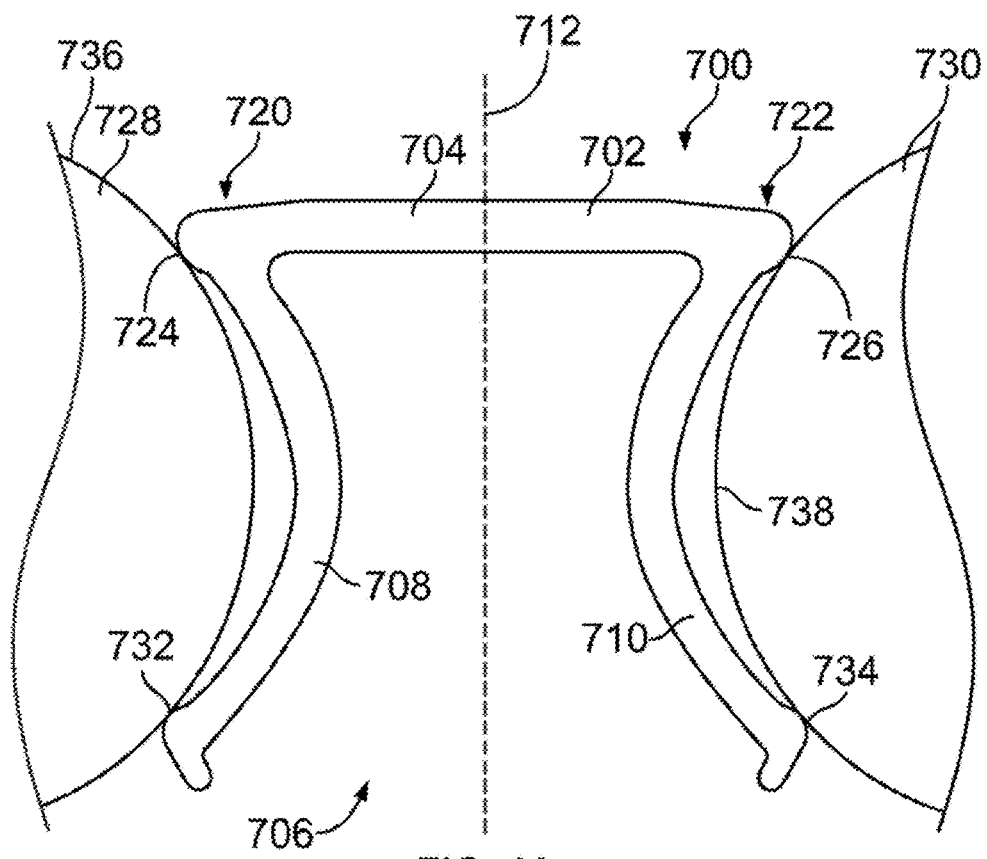
FIG. 11 is an elevational view of another gap blocker that is symmetrical about a center axis.

Regarding FIG. 11, a gap blocker 700 is provided that is similar in many respects to the gap blockers discussed above. The gap blocker 700 has a body 702 including an upper blocking portion 704 and a lower portion 706 with leg portions 708, 710. The body 702 has a center axis 712 and the body 702 is symmetrical about the axis 712. The upper blocking portion 704 includes outer roller engagement portions 720, 722 that are similar and include convex surfaces 724, 726 for contacting rollers 728, 730. The leg portions 708, 710 likewise have convex surface portions 732, 734 that form line contacts with surfaces 736, 738 of the rollers 728, 730. The leg portions 708, 710 are spaced from the roller surfaces 736, 738 except at the convex surface portions 732, 734.

Figure 12:
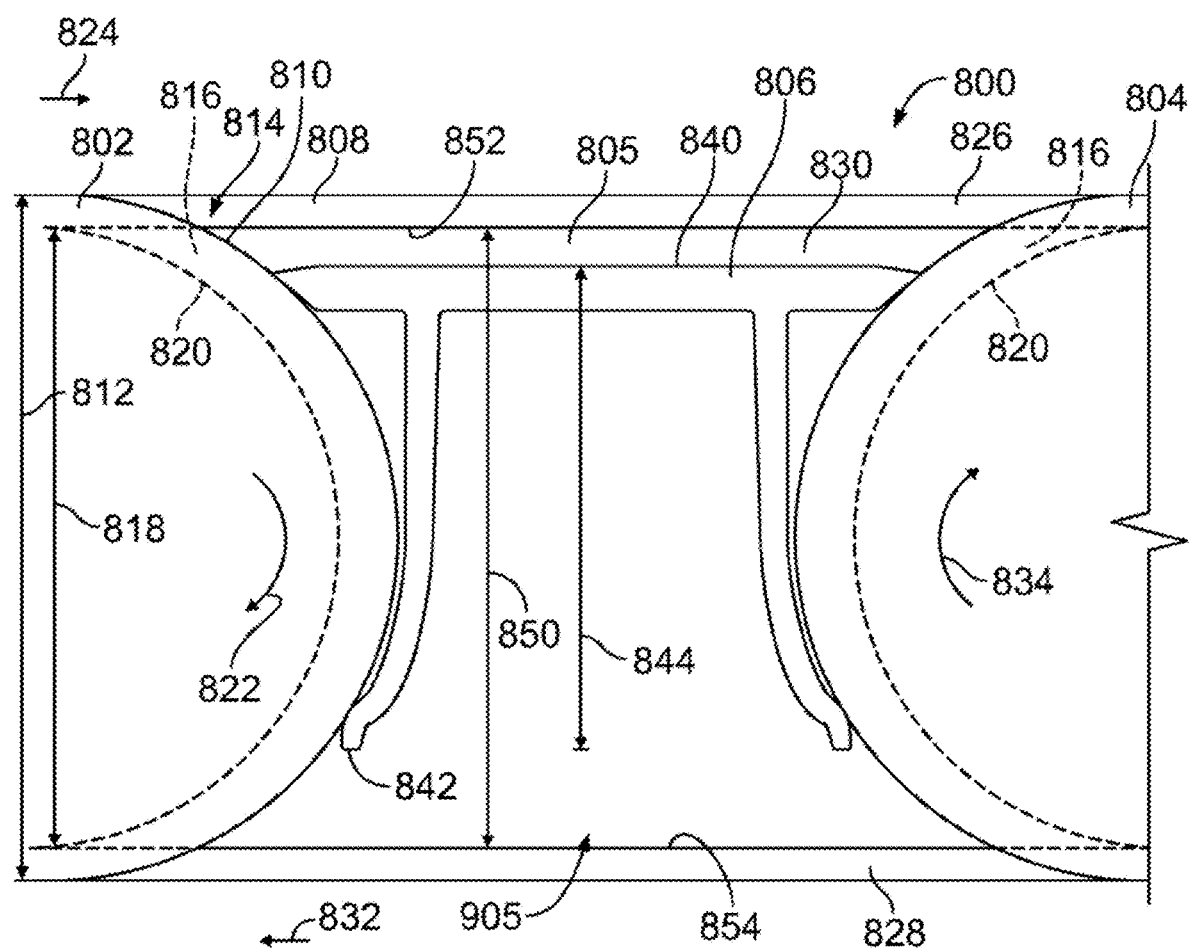
FIG. 12 is an elevational view of a portion of a roller conveyor including rollers, a drive member connecting the rollers, and a gap blocker sized to fit in an opening formed by the rollers and the drive member.

Regarding FIG. 12, a system 800 is provided that includes rollers 802, 804 having a gap 905 therebetween, a gap blocker 806 similar to gap blocker 400 discussed above, and a drive member such as an o-ring 808. The o-ring 808 may be a single, unitary member or may include multiple members such as a cable. In some embodiments, the o-ring 808 is made of a polymer material. The drive member may take other forms, such as a chain.

The rollers 802, 804 each have a cylindrical outer surface 810 with an outer diameter 812 that supports the gap blocker 806 and a grooved portion 814. The grooved portion 814 includes a groove 816 formed in the cylindrical outer surface 810, the groove 816 having a minimum outer diameter 818.

The o-ring 808 loops around the rollers 802, 804 such that the o-ring 808 has an upper portion 826 and a lower portion 828 that extend across the gap 805. The o-ring 808 has a semi-circular portion extending in the groove 816 of each on an opposite side of the roller 802, 804 from the gap blocker 806. The semi-circular portions of the o-ring 808 connect the upper and lower portions 826, 828. The rollers 802, 804 and upper and lower portions 826, 828 of the o-ring 808 form an opening 830 in the gap 905. The o-ring 808 engages the rollers 802, 804 by extending into the grooves 816 of the rollers 802, 804 and engaging surfaces 820 of the grooves 816.

In one embodiment, the roller 802 is rotated in direction 822 by an o-ring connected to an upstream roller such that the roller 802 rotates in direction 822 to convey an object in a downstream direction 824. The o-ring 808 may be made of a resilient material and is under tension when the o-ring 808 extends around the rollers 802, 804. The tension in the o-ring 808 tightly engages the o-ring 808 with the surfaces 820 of the grooves 816. Rotation of the roller 802 in direction 822 urges lower portion 828 of the o-ring 808 in direction 832 which causes the o-ring 808 to rotate the roller 804 in direction 834. The rotation of the roller 802 in direction 822 also pays out the upper portion 826 of the o-ring 808 off of the roller 802 and directs the upper portion 826 toward the roller 804.

The gap blocker 806 has an upper surface 840, a lower surface 842, and a height 844. The height 844 of the gap blocker 806 is smaller than the outer diameter 812 of the roller outer surface 810 and the minimum outer diameter 818 of the groove 816 of the rollers 802, 804. The height 844 of the gap blocker 806 is also smaller than a distance 850 between a lower surface portion 852 of the upper portion 826 of the o-ring 808 and an upper surface portion 854 of the lower portion 828 of the o-ring 808. In this manner, the gap blocker 806 may extend laterally (into or out of the page in FIG. 12) along the cylindrical outer surfaces 810 of the rollers 802, 804 to block objects from falling through the gap 805 while also extending into the opening 830 formed by the o-ring 808 and rollers 802, 804 in clearance with the o-ring 808. Because the gap blocker 806 is in clearance with the o-ring 808, the o-ring 808 may thereby transfer rotation of the roller 802 to the roller 804 without interference from the gap blocker 806.

In some applications, the gap blocker 806 is initially installed in the gap 805 with a portion of the gap blocker 806 extending in the opening 830 formed by the o-ring 808 and the rollers 802, 804. In other applications, the gap blocker 806 is installed in the gap 805 laterally offset from the grooves 816 and o-ring 808. Over time, the gap blocker 806 may shift laterally into the opening 830 formed by the o-ring 808 and the rollers 802, 804 without interfering with movement of the o-ring 808.

Figure 13:
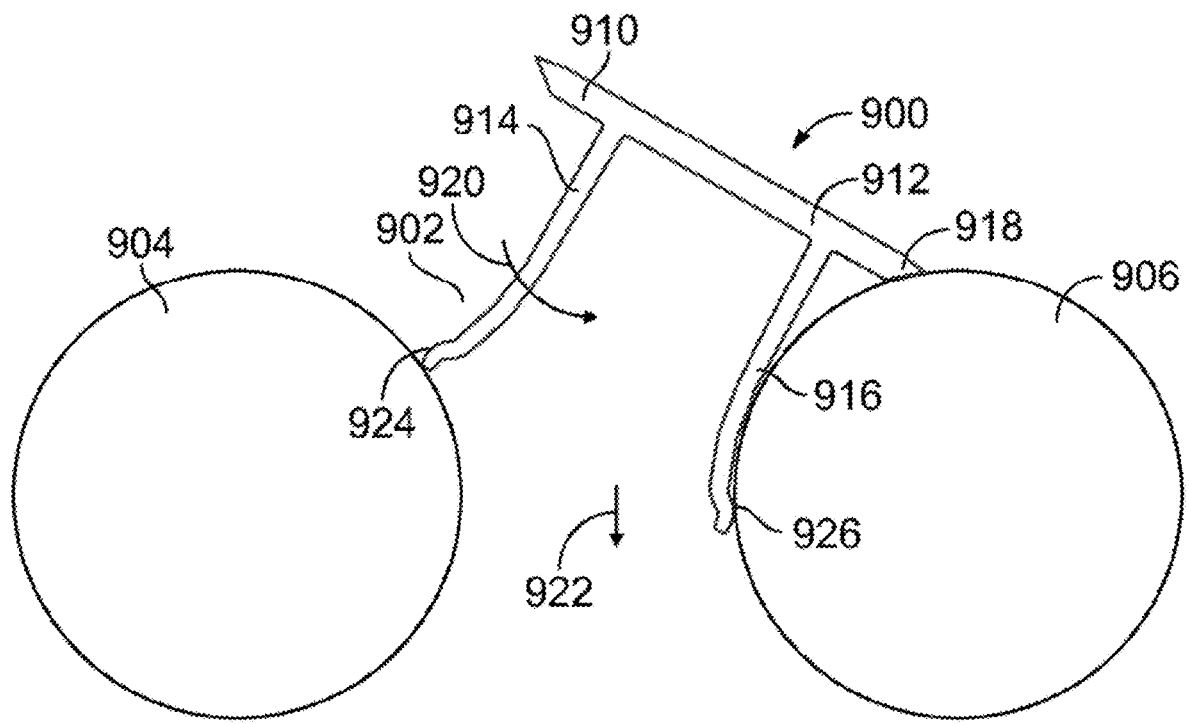
FIG. 13 is an elevational view of a pair of rollers as a gap blocker is inserted into a gap between the rollers.

With reference to FIG. 13, a gap blocker 900 is shown being inserted into a gap 902 between rollers 904, 906. The gap blocker 900 is similar to the gap blockers discussed above and includes a body 910 having an upper blocking portion 912 and leg portions 914, 916. To position the gap blocker 900 in the gap 902, an outboard portion 918 of the upper blocking portion 912 and the leg portion 916 are positioned against a cylindrical outer surface of the roller 906 and the leg portion 914 is deflected in direction 920 toward leg portion 916. With the leg portion 914 deflected, the gap blocker 900 may be rocked or advanced in direction 922 to position contact portions 924, 926 of the leg portions 914, 916 below the narrowest portion of the gap 902.

Figure 14:
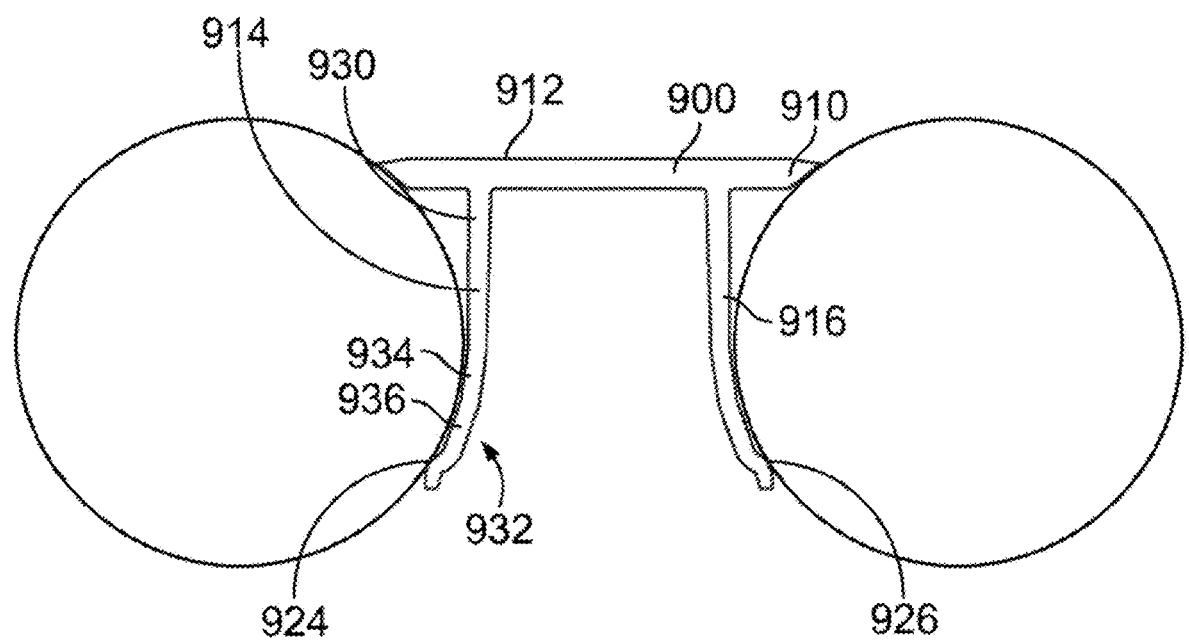
FIG. 14 is an elevational view of the rollers and the gap blocker of FIG. 13 after the gap blocker has been installed in the gap.

With regard to FIG. 14, each leg portion 914, 916 of the gap blocker 900 includes a straight portion 930 extending downward from the upper blocking portion 912 and a curved portion 932 below the straight portion 930. The curved portion 932 has a faceted configuration including straight segments 934, 936 extending transversely to the straight portion 930 and one another. The faceted configuration of the leg portions 914, 916 may make the body 910 of the gap blocker 900 easier to injection mold. Specifically, gap blocker 900 may be made of a molded plastic and the faceted configuration of the leg portions 914, 916 allows a metal mold portion to pull away from a plastic of the gap blocker 900 without scratching or pulling the plastic as the metal mold portion retracts.

Like other gap blockers discussed herein, the gap blocker 900 may be removed from the gap 902 by lifting upward on the upper blocking portion 912. The cylindrical outer surfaces of the rollers 904, 906 shift the leg portions 914, 916 together relative to the upper blocking portion 912 which temporarily decreases a maximum width across the leg portions 914, 916. The gap blocker 900 is continued to be lifted upward until the contact portions 924, 926 advance above the narrowest portion of the gap 902. The leg portions 914, 916 resiliently shift back away from each other relative to the upper blocking portion 912 once the leg portions 914, 916 have been withdrawn from the gap 902.

Uses of singular terms such as "a," "an," are intended to cover both the singular and the plural, unless otherwise indicated herein or clearly contradicted by context. The terms "comprising," "having," "including," and "containing" are to be construed as open-ended terms. It is intended that the phrase "at least one of" as used herein be interpreted in the disjunctive sense. For example, the phrase "at least one of A and B" is intended to encompass A, B, or both A and B.

While there have been illustrated and described particular embodiments of the present invention, it will be appreciated that numerous changes and modifications will occur to those skilled in the art, and it is intended for the present invention to cover all those changes and modifications which fall within the scope of the appended claims.

What is claimed is:

1. A gap blocker for a roller conveyor including upstream and downstream rollers and a gap therebetween, the upstream and downstream rollers rotatable to convey an object in a downstream longitudinal direction across the gap, the gap blocker comprising:

a body to be positioned in the gap, the body having a unitary, one-piece construction;

an upper blocking portion of the body to be positioned above a narrowest portion of the gap;

upstream and downstream contact portions of the upper blocking portion configured to slidingly contact the upstream and downstream rollers above the narrowest portion of the gap and support the body in the gap as the upstream and downstream rollers rotate during operation of the roller conveyor;

the upper blocking portion having a width extending in the downstream longitudinal direction between the upstream and downstream contact portions that is larger than a width of the gap at the narrowest portion of the gap;

an upstream lower member of the body spaced longitudinally downstream of the upstream contact portion and having an upstream upper portion extending linearly and downwardly substantially perpendicular to the width of the upper blocking portion, the upstream lower member having an upstream lower free end portion to be positioned below the narrowest portion of the gap adjacent the upstream roller, the upstream lower member sized to extend from above the narrowest portion of the gap down to the upstream lower free end portion below the narrowest portion of the gap with the body in the gap; and a downstream lower member spaced longitudinally upstream of the downstream contact portion, the downstream lower member longitudinally spaced from the upstream lower member, the downstream lower member having a downstream upper portion extending linearly and downwardly substantially perpendicular to the width of the upper blocking portion, the downstream lower member having a downstream lower free end portion to be positioned below the narrowest portion of the gap adjacent the downstream roller, the downstream lower member sized to extend from above the narrowest portion of the gap down to the downstream lower free end portion below the narrowest portion of the gap.

2. The gap blocker of claim 1 wherein at least one of the upstream and downstream lower free end portions is configured to be spaced from the adjacent upstream and downstream roller with the contact portions slidingly contacting the upstream and downstream rollers and supporting the body in the gap during operation of the roller conveyor.

3. The gap blocker of claim 2 wherein the at least one of the upstream and downstream free end portions includes the upstream lower free end portion and the downstream lower free end portion.

4. The gap blocker of claim 1 wherein the upper blocking portion includes an upstream outboard portion extending substantially perpendicular to the upstream upper portion of the upstream lower member;

wherein the upper blocking portion includes a downstream outboard portion extending substantially perpendicular to the downstream upper portion of the downstream lower member; and wherein the upstream and downstream outboard portions include the contact portions for slidingly contacting the upstream and downstream rollers.

5. The gap blocker of claim 1 wherein the body includes upstream and downstream junctures connecting the upper blocking portion and the upstream and downstream upper portions; and wherein the upstream and downstream junctures are above the narrowest portion of the gap with the body in the gap.

6. The gap blocker of claim 1 wherein the upstream and downstream upper portions extend substantially parallel to one another.

7. The gap blocker of claim 1 wherein the longitudinal spacing between the upstream and downstream lower members extends from the upper blocking portion to the upstream and downstream lower free end portions.

8. The gap blocker of claim 1 wherein the upstream lower member comprises a first leg portion and a second leg portion having a lateral spacing therebetween.

9. The gap blocker of claim 1 wherein one of the upstream and downstream lower free end portions is shiftable toward the other of the upstream and downstream free end portions to facilitate advancing of the upstream and downstream lower members into the gap.

10. The gap blocker of claim 1 wherein the upstream and downstream upper portions of the upstream and downstream lower members are offset longitudinally from the contact portions, and the upstream and downstream upper portions and the upstream and downstream rollers have longitudinal spacings therebetween with the body in the gap.

11. The gap blocker of claim 1 wherein the upstream and downstream lower members each include an intermediate portion configured to extend in the narrowest portion of the gap, the upstream and downstream lower members having a longitudinal distance therebetween that increases as the upstream and downstream lower members extend from the intermediate portions to the upstream and downstream lower free end portions.

12. The gap blocker of claim 1 wherein the upstream and downstream upper portions include outer surface portions facing the upstream and downstream rollers and configured to be in clearance with the upstream and downstream rollers as the upstream and downstream rollers rotate during operation of the roller conveyor.

13. The gap blocker of claim 1 wherein the body has a length perpendicular to the width of the upper blocking portion, the length of the body being larger than the width of the upper blocking portion.

14. The gap blocker of claim 1 wherein the body is injection-molded plastic.

* * * * *